US010075868B2

(12) United States Patent
Luo et al.

(10) Patent No.: US 10,075,868 B2
(45) Date of Patent: Sep. 11, 2018

(54) CONTROLLING REPORTING OPERATIONS FOR WIRELESS COMMUNICATION

(71) Applicant: QUALCOMM Incorporated, San Diego, CA (US)

(72) Inventors: Tao Luo, San Diego, CA (US); Sumeeth Nagaraja, San Diego, CA (US); Sony Akkarakaran, Poway, CA (US); Makesh Pravin John Wilson, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/685,836

(22) Filed: Aug. 24, 2017

(65) Prior Publication Data

US 2018/0124625 A1    May 3, 2018

Related U.S. Application Data

(60) Provisional application No. 62/417,233, filed on Nov. 3, 2016.

(51) Int. Cl.
| | |
|---|---|
| *H04L 12/28* | (2006.01) |
| *H04W 24/10* | (2009.01) |
| *H04B 7/06* | (2006.01) |
| *H04L 5/00* | (2006.01) |

(52) U.S. Cl.
CPC .......... *H04W 24/10* (2013.01); *H04B 7/0621* (2013.01); *H04L 5/00* (2013.01); *H04L 5/0035* (2013.01); *H04L 5/0053* (2013.01); *H04B 7/0626* (2013.01)

(58) Field of Classification Search
CPC .... H04W 24/10; H04L 5/0053; H04L 5/0035; H04B 7/0621; H04B 7/0626
See application file for complete search history.

(56) References Cited

U.S. PATENT DOCUMENTS

| | | | |
|---|---|---|---|
| 6,445,917 B1 | 9/2002 | Bark et al. | |
| 8,954,052 B2 | 2/2015 | Huang et al. | |
| 2009/0005029 A1* | 1/2009 | Wang | H04W 24/10 455/423 |
| 2010/0332647 A1* | 12/2010 | Agulnik | H04L 67/24 709/224 |

(Continued)

FOREIGN PATENT DOCUMENTS

| | | |
|---|---|---|
| CN | 101867968 A | 10/2010 |
| GB | 2507821 A | 5/2014 |

(Continued)

OTHER PUBLICATIONS

International Search Report and Written Opinion—PCT/US2017/048706—ISA/EPO—dated Nov. 6, 2017.

*Primary Examiner* — Clemence S Han
(74) *Attorney, Agent, or Firm* — Clint R. Morin; Loza & Loza

(57) ABSTRACT

Various aspects of the disclosure relate to controlling reporting operations based on the timing of certain reporting events. In some aspects, the manner in which an apparatus performs reporting operations may depend on how far apart in time two reporting events occur. As one example, if the timing of an event-triggered report closely follows the timing of a request-triggered report, the apparatus may skip or otherwise alter the event-triggered reporting.

30 Claims, 19 Drawing Sheets

(56) References Cited

U.S. PATENT DOCUMENTS

| | | | |
|---|---|---|---|
| 2011/0009067 A1* | 1/2011 | Iwamura | H04W 24/10 455/67.11 |
| 2013/0329593 A1* | 12/2013 | Kim | H04W 24/10 370/252 |
| 2014/0315537 A1 | 10/2014 | Van et al. | |
| 2015/0100169 A1* | 4/2015 | McKinney | H04L 67/10 700/284 |

FOREIGN PATENT DOCUMENTS

| | | |
|---|---|---|
| WO | WO-0070897 A1 | 11/2000 |
| WO | WO-2008157800 A1 | 12/2008 |
| WO | WO-2017084005 A1 | 5/2017 |

\* cited by examiner

CONTROLLING REPORTING OPERATIONS FOR WIRELESS COMMUNICATION

CROSS-REFERENCE TO RELATED APPLICATIONS

This application claims priority to and the benefit of provisional patent application No. 62/417,233 filed in the U.S. Patent and Trademark Office on Nov. 3, 2016, the entire content of which is incorporated herein by reference.

INTRODUCTION

Various aspects described herein relate to wireless communication and, more particularly but not exclusively, to controlling reporting operations.

Wireless communication networks are widely deployed to provide various communication services such as telephony, video, data, messaging, broadcasts, and so on. Such networks, which may be multiple access networks, can support communication for multiple user devices by sharing the available network resources.

In a cell-based network, a device may monitor a communication channel over time to ensure that the device is communicating via the best available cell (e.g., since channel conditions may change over time as a device moves within a cell or due to interference from other devices). This monitoring may involve measurement reporting. For example, a first device may send a report to a second device in response to a request from the second device. As another example, a first device may send a report to a second device in response to an event trigger.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In one aspect, the disclosure provides an apparatus configured for communication that includes a memory device and a processing circuit coupled to the memory device. The processing circuit is configured to: determine a period of time between a first reporting event associated with request-triggered reporting and a second reporting event associated with an event-triggered reporting; compare the period of time with a threshold; and control a reporting operation according to a result of the comparison.

Another aspect of the disclosure provides a method for communication including: determining a period of time between a first reporting event associated with request-triggered reporting and a second reporting event associated with an event-triggered reporting; comparing the period of time with a threshold; and controlling a reporting operation according to a result of the comparison.

Another aspect of the disclosure provides an apparatus configured for communication. The apparatus including: means for determining a period of time between a first reporting event associated with request-triggered reporting and a second reporting event associated with an event-triggered reporting; means for comparing the period of time with a threshold; and means for controlling a reporting operation according to a result of the comparison.

Another aspect of the disclosure provides a non-transitory computer-readable medium storing computer-executable code, including code to: determine a period of time between a first reporting event associated with request-triggered reporting and a second reporting event associated with an event-triggered reporting; compare the period of time with a threshold; and control a reporting operation according to a result of the comparison.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

The accompanying drawings are presented to aid in the description of aspects of the disclosure and are provided solely for illustration of the aspects and not limitations thereof.

DETAILED DESCRIPTION

Figure 1:
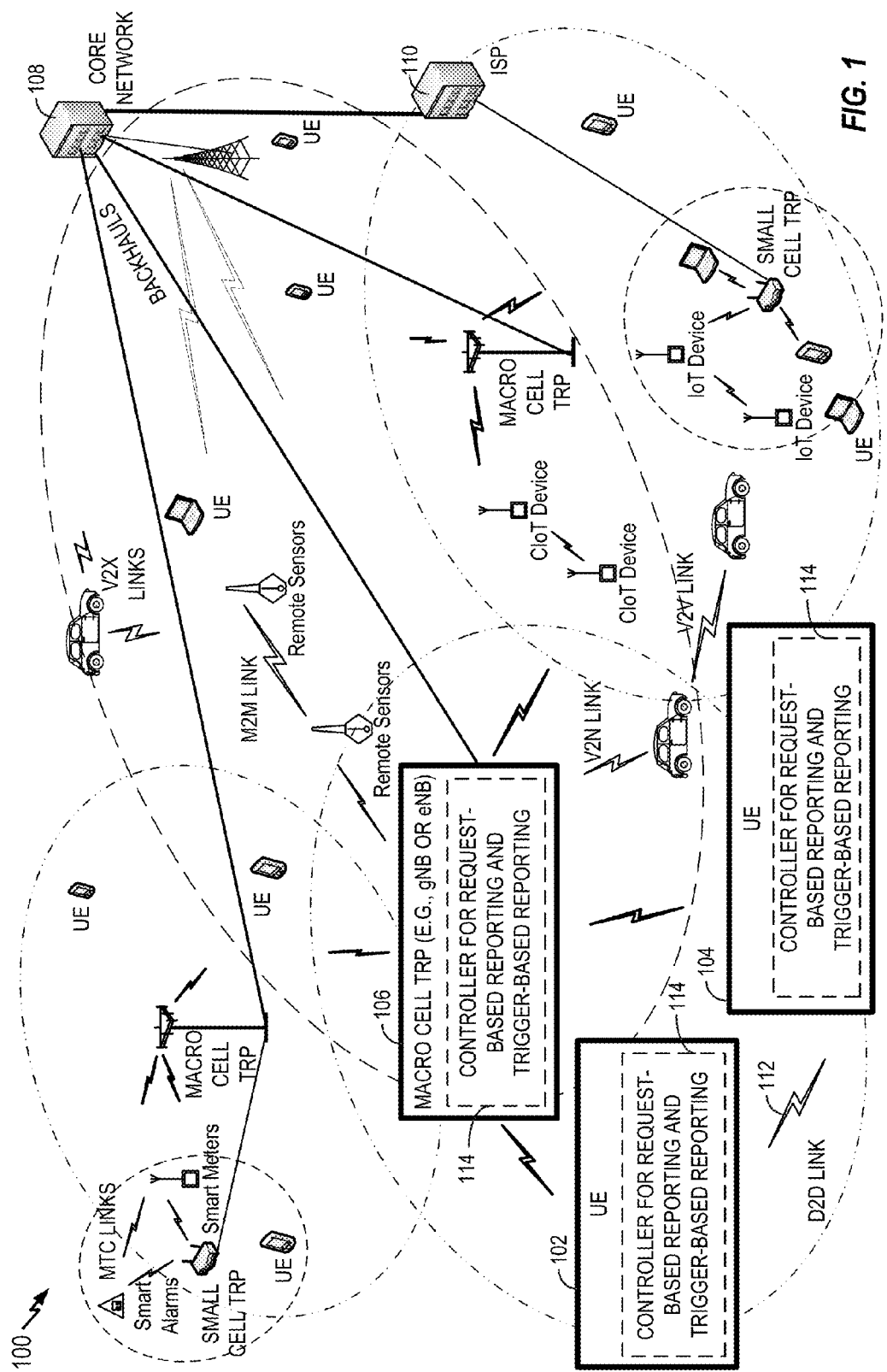
FIG. 1 illustrates an example wireless communication system within which aspects of the disclosure may be implemented.

Various aspects of the disclosure relate to communicating uplink control information. In some implementations, the uplink control information provides feedback for beamformed communication.

The disclosure relates in some aspects to controlling reporting operations based on the timing of certain reporting events. In some aspects, the manner in which an apparatus performs reporting operations may depend on how far apart in time two reporting events occur. For example, if an event-triggered report is close in time to a request-triggered report, the apparatus may cancel or modify the event-triggered reporting.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. Moreover, alternate configurations may be devised without departing from the scope of the disclosure. Additionally, well-known elements will not be described in detail or will be omitted so as not to obscure the relevant details of the disclosure.

The various concepts presented throughout this disclosure may be implemented across a broad variety of telecommunication systems, network architectures, and communication standards. For example, the 3rd Generation Partnership Project (3GPP) is a standards body that defines several wireless communication standards for networks involving the evolved packet system (EPS), frequently referred to as long-term evolution (LTE) networks. Evolved versions of the LTE network, such as a fifth-generation (5G) network, may provide for many different types of services or applications, including but not limited to web browsing, video streaming, VoIP, mission critical applications, multi-hop networks, remote operations with real-time feedback (e.g., tele-surgery), etc. Thus, the teachings herein can be implemented according to various network technologies including, without limitation, 5G technology, fourth generation (4G) technology, third generation (3G) technology, and other network architectures. Also, the techniques described herein may be used for a downlink, an uplink, a peer-to-peer link, or some other type of link.

The actual telecommunication standard, network architecture, and/or communication standard used will depend on the specific application and the overall design constraints imposed on the system. For purposes of illustration, the following may describe various aspects in the context of a 5G system and/or an LTE system. It should be appreciated, however, that the teachings herein may be used in other systems as well. Thus, references to functionality in the context of 5G and/or LTE terminology should be understood to be equally applicable to other types of technology, networks, components, signaling, and so on.

Example Communication System

FIG. 1 illustrates an example of a wireless communication system 100 where a user equipment (UE) can communicate with other devices via wireless communication signaling. For example, a first UE 102 and a second UE 104 may communicate with a transmit receive point (TRP) 106 using wireless communication resources managed by the TRP 106 and/or other network components (e.g., a core network 108, an internet service provider (ISP) 110, peer devices, and so on). In some implementations, one or more of the components of the system 100 may communicate with each other directedly via a device-to-device (D2D) link 112 or some other similar type of direct link.

Communication of information between two or more of the components of the system 100 may involve measurement reporting. For example, the TRP 106 may request a measurement report from the UE 102 or the UE 104. As another example, the UE 102 or the UE 104 may, in response to a local trigger, send a measurement report to the TRP 106. As yet another example, the TRP 106 may request a measurement report from another TRP. Thus, in accordance with the teachings herein, one or more of the UE 102, the UE 104, the TRP 106, or some other component of the system 100 may include a controller for request-based reporting and trigger-based reporting 114.

The components and links of the wireless communication system 100 may take different forms in different implementations. Examples of UEs may include, without limitation, cellular devices, Internet of Things (IoT) devices, cellular IoT (CIoT) devices, LTE wireless cellular devices, machine-type communication (MTC) cellular devices, smart alarms, remote sensors, smart phones, mobile phones, smart meters, personal digital assistants (PDAs), personal computers, mesh nodes, and tablet computers.

In some aspects, a TRP may refer to a physical entity that incorporates radio head functionality for a particular physical cell. In some aspects, the TRP may include 5G new radio (NR) functionality with an air interface based on orthogonal frequency division multiplexing (OFDM). NR may support, for example and without limitation, enhanced mobile broadband (eMBB), mission-critical services, and wide-scale deployment of IoT devices. The functionality of a TRP may be similar in one or more aspects to (or include or be incorporated into) the functionality of a CIoT base station (C-BS), a NodeB, an evolved NodeB (eNodeB), radio access network (RAN) access node, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other suitable entity. In different scenarios (e.g., NR, LTE, etc.), a TRP may be referred to as a gNodeB (gNB), an eNB, a base station, or referenced using other terminology.

Various types of network-to-device links and D2D links may be supported in the wireless communication system 100. For example, D2D links may include, without limitation, machine-to-machine (M2M) links, MTC links, vehicle-to-vehicle (V2V) links, and vehicle-to-anything (V2X) links. Network-to-device links may include, without limitation, uplinks (or reverse links), downlinks (or forward links), and vehicle-to-network (V2N) links.

Example Communication Components

Figure 2:
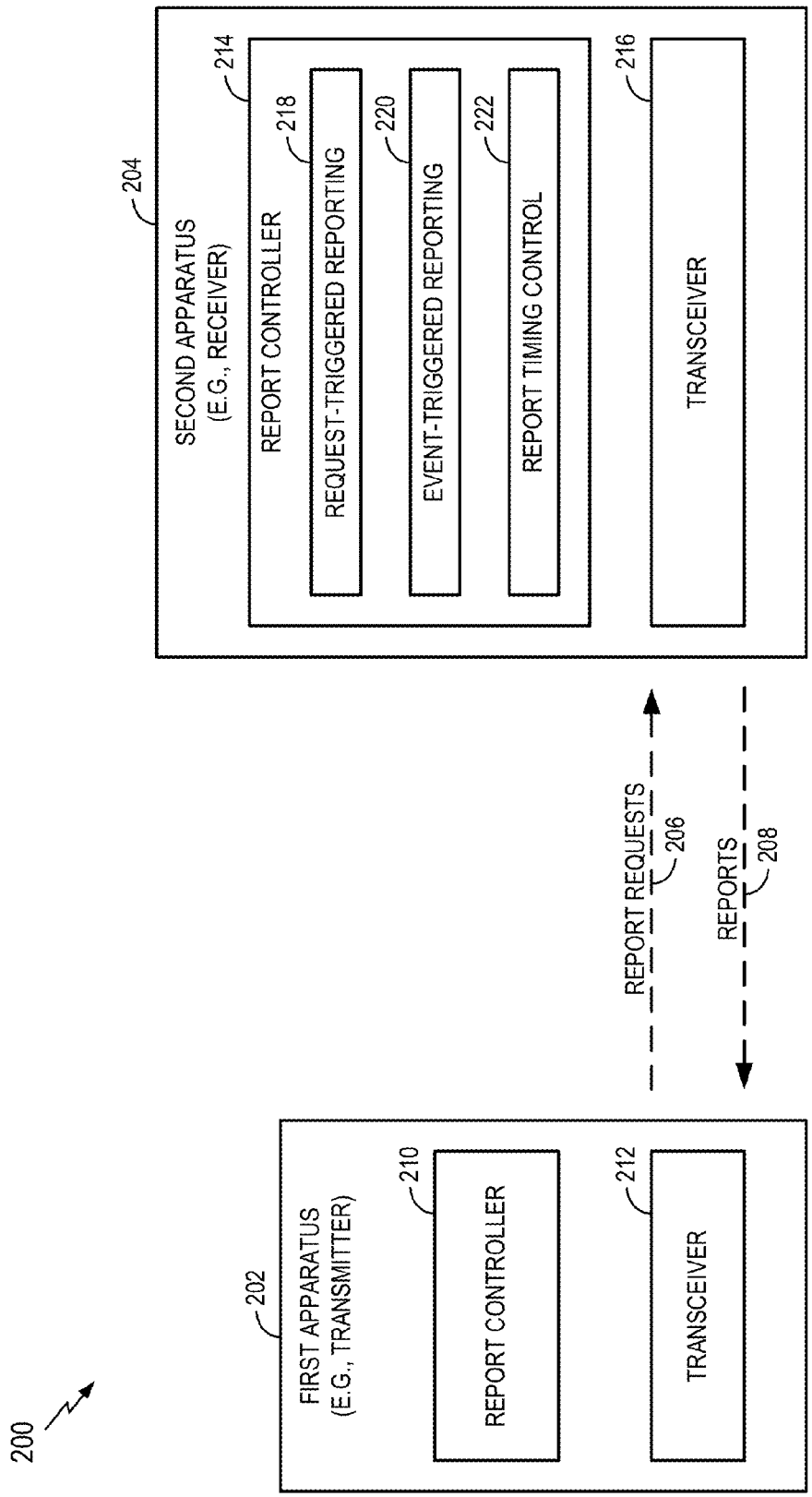
FIG. 2 illustrates example communication components that support reporting in accordance with some aspects of the disclosure.

FIG. 2 illustrates a communication system 200 that includes a first apparatus 202 (e.g., which may be referred to as a transmitter herein) and a second apparatus 204 (e.g., which may be referred to as a receiver herein). The first apparatus 202 sends report requests 206 to the second apparatus 204 and receives reports 208 from the second apparatus 204. For example, the first apparatus 202 may request a measurement report from the second apparatus 204. The first apparatus 202 and the second apparatus 204 may correspond to, for example, the UE 102, the UE 104, the TRP 106, or some other component of FIG. 1.

The first apparatus 202 includes a report controller 210 for generating the report requests 206 sent by the first apparatus 202 and processing the reports 208 received by the first apparatus 202. The first apparatus 202 also includes a transceiver 212 for sending the report requests 206 and receiving the reports 208 via wireless communication signaling (e.g., radio frequency (RF) signaling).

The second apparatus 204 includes a report controller 214 for processing the report requests 206 received by the second apparatus 204 and generating the reports 208 sent by the second apparatus 204. The second apparatus 204 also includes a transceiver 216 for receiving the report requests 206 and sending the reports 208 via wireless communication signaling.

The reports 208 sent by the report controller 214 may involve request-triggered reporting 218 (e.g., in response to a report request 206) or event-triggered reporting 220. As an example of the latter type of reporting, certain events (e.g., signal measurement events) at the second apparatus 204 may trigger the sending of a measurement report.

In accordance with the teachings herein, the report controller 214 includes report timing control 222 that controls reporting operations based on the timing of certain reporting events. For example, the manner in which the report controller 214 performs its reporting operations may depend on how far apart in time two reporting events occur. As one specific example, if the timing of an event-triggered report closely follows the timing of a request-triggered report, the event-triggered reporting may be skipped or otherwise altered.

Request-Triggered and Event-Triggered Reporting

The disclosure relates in some aspects to reporting operations in a wireless communication system. For example, a receiver may send reports to a transmitter in response to a request or in response to the occurrence of an event trigger. For purposes of illustration, the following may describe various aspects in the context of measurement reporting, beam management (e.g., switching from one beam to another beam), and mobility management (e.g., switching from one cell to another cell). It should be appreciated, however, that the teachings herein may be employed for other types of reporting and other operations as well.

In some cases, a transmitter may request a report from a receiver. This may occur, for example, a-periodically or periodically. A request message may request a single report or multiple reports (e.g., periodic reports). The transmitter may be, for example, an enhanced-NodeB (eNB), a gigabit-NodeB (gNB), or a user equipment (UE). The receiver may be, for example, a UE, an eNB, or a gNB.

In some scenarios, the report includes beam quality measurements made at the receiver (e.g., at a UE). In some scenarios, the report includes channel quality measurements made at the receiver (e.g., at a UE).

In some cases, a system may define an event-triggered report at a receiver. For example, based on a beam measurement made by the receiver, the receiver may report the beam measurement to a transmitter. As one specific example, reporting may be triggered at the receiver if the beam reference signal received power (RSRP) difference between two beams (as measured by the receiver) exceeds a threshold. As another specific example, reporting may be triggered at the receiver if the beam reference signal received quality (RSRQ) difference between two beams (as measured by the receiver) exceeds a threshold. As yet another specific example, reporting may be triggered at the receiver if the beam reference signal signal-to-noise ratio (RS-SNR) difference between two beams (as measured by the receiver) exceeds a threshold.

In any of these scenarios, the receiver may request an uplink grant (or some other type of grant) through, for example, a scheduling request if there is no active grant for receiver (e.g., uplink resources or some other type of resources are not currently allocated for the receiver). Alternatively, the receiver may send a report using an autonomous transmission via resources reserved for this purpose. The resources may be control resources and/or data resources.

Depending on the allocated resource for the report, the amount of information in the report may be limited. If a short physical uplink control channel (PUCCH) or a short physical uplink shared channel (PUSCH) (e.g., one symbol in length) is used for report, the amount of the information that can be sent via the report may be very limited. For example, the receiver might only be able to report the measurement for the best beam. Conversely, if a long PUCCH or PUSCH is used, the amount of the information may be larger. For example, a long PUCCH or PUSCH may span a slot (multiple symbols).

Redundant Transmissions

When the two reporting events occur close in time to each other, a redundant transmission could occur. For example, when an eNB has requested a full report on beam quality measurements and a UE transmits the report, an event may trigger at the UE shortly after this reporting. Here, the UE may use a service request (SR) to request an uplink resource for the additional report. Since, the UE has just sent a full report, however, the event-triggered report would be redundant.

In millimeter wave (mmW) scenarios, such an event may occur relatively frequently either from the UE side or from the eNB side. These events may occur, for example, due to the use of relatively narrow beams, whereby signal conditions may change frequently with changes in the orientation (e.g., elevation, position, etc.) of the UE and/or the eNB; and/or with movement in the surroundings of the UE and/or the eNB.

The disclosure relates in some aspects to reducing redundant transmissions and associated resource requests, if applicable. In some aspects, the disclosed techniques may reduce receiver power consumption and interference to the network as a result of suppressing the unnecessary transmissions and resource requests.

FIGS. 3, 5, 7, 9, 11, and 13 illustrate several reporting scenarios. In these examples, the transmitter is an eNB and the receiver is an UE. Other apparatuses could be used in other implementations.

First Scenario

Figure 3:
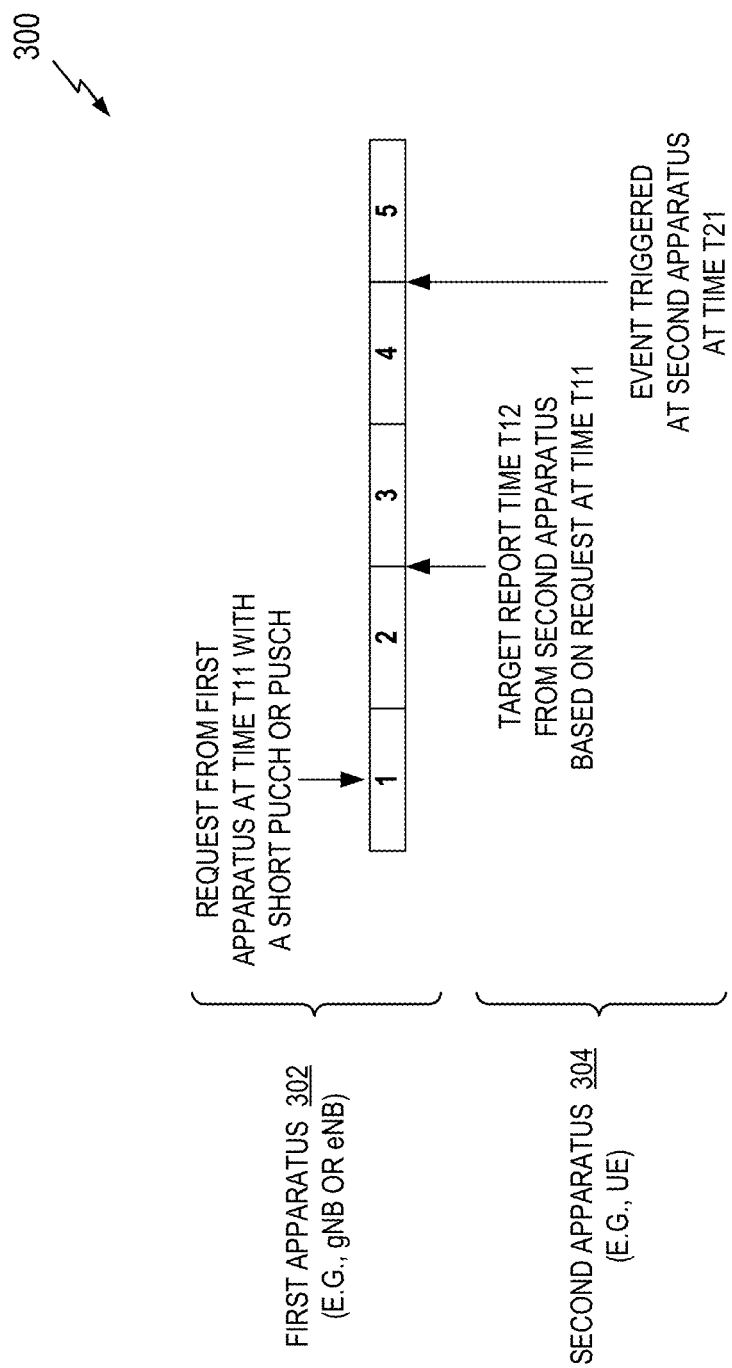
FIG. 3 illustrates a first reporting scenario in accordance with some aspects of the disclosure.

FIG. 3 illustrates a first scenario 300 (Case 1a) where a first apparatus 302 (e.g., a gNB or an eNB) communicates with a second apparatus 304 (e.g., a UE). An event triggered at the second apparatus 304 (at time T21) is after the report at time T12 which is requested at time T11 by the first apparatus 302. Thus, the second apparatus 304 could also schedule another report (not shown in FIG. 3) after the time T21 to service the event trigger. However, time T21 and time T11 are relatively close to each other. Thus, the event-triggered report could be redundant. However, the resource for the report at time T11 has a relatively limited payload (e.g., a short PUCCH or a short PUSCH). For example, the first apparatus 302 may have requested that the second apparatus 304 send a report using the short PUCCH or the short PUSCH.

Accordingly, an event-triggered report might still be sent in this scenario because the report at time T12 might not have sent all of the information that would be sent in the event-triggered report. However, the event-triggered report may be modified (e.g., the payload shortened) to prevent retransmission of any information sent in the time T12 report.

Figure 4:
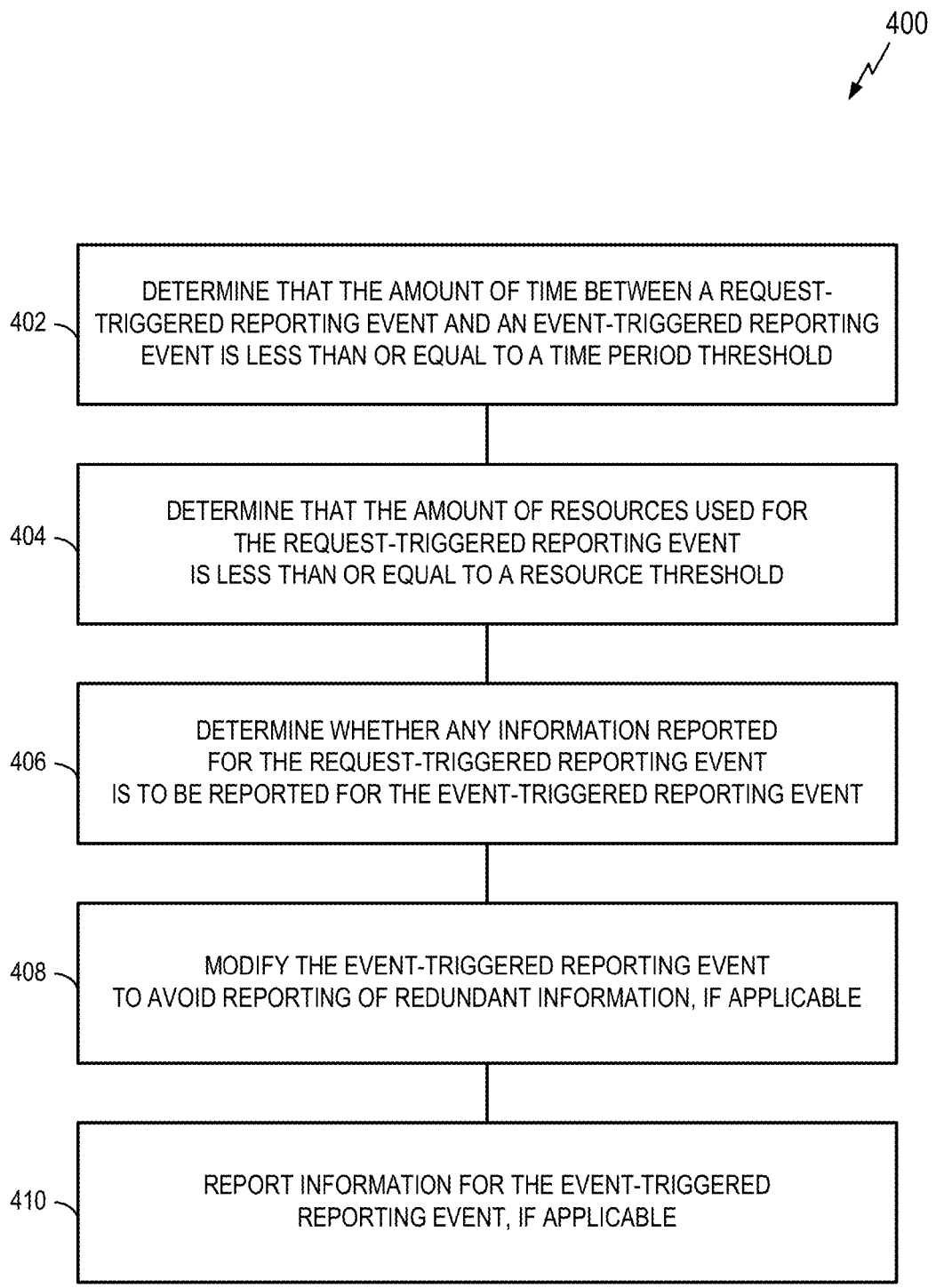
FIG. 4 is a flowchart illustrating an example of a reporting process in accordance with the first reporting scenario of FIG. 3.

FIG. 4 illustrates a process 400 for communication in accordance with some aspects of the first scenario 300. The process 400 may take place within a processing circuit (e.g., the processing circuit 1710 of FIG. 17), which may be located in a UE, a TRP, a BS, an eNB, a gNB, or some other suitable apparatus. Of course, in various aspects within the scope of the disclosure, the process 400 may be implemented by any suitable apparatus capable of supporting communication-related operations.

At block 402, an apparatus (e.g., a UE, an eNB, or a gNB) determines that the amount of time between a request-triggered reporting event and an event-triggered reporting event is less than or equal to a time period threshold.

At block 404, the apparatus determines that the amount of resources used for the request-triggered reporting event is less than or equal to a resource threshold.

At block 406, the apparatus determines whether any information reported for the request-triggered reporting event is to be reported for the event-triggered reporting event.

At block 408, the apparatus modifies the event-triggered reporting event to avoid reporting of redundant information, if applicable.

At block 410, the apparatus reports information for the event-triggered reporting event, if applicable.

In some aspects, the process 400 may include any combination of the above operations and/or features.

Second Scenario

Figure 5:
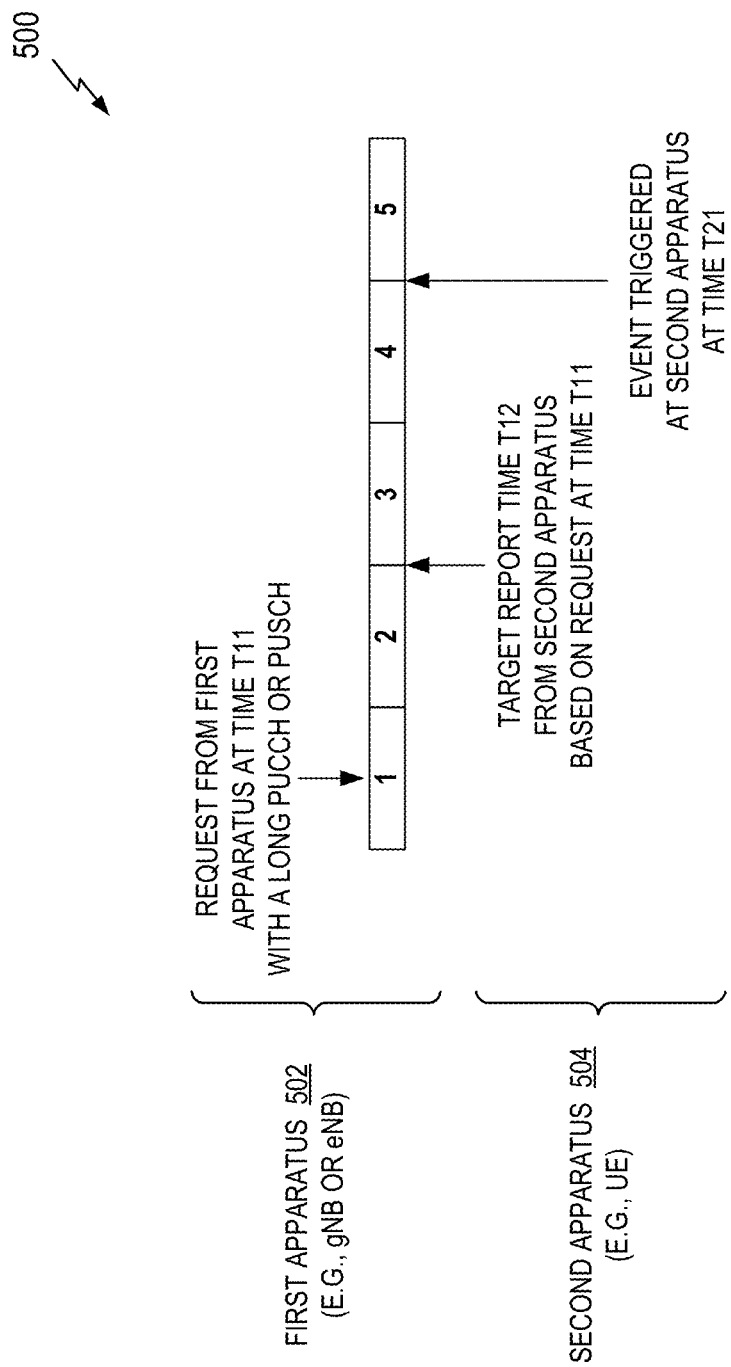
FIG. 5 illustrates a second reporting scenario in accordance with some aspects of the disclosure.

FIG. 5 illustrates a second scenario 500 (Case 1b) where a first apparatus 502 (e.g., a gNB or an eNB) communicates with a second apparatus 504 (e.g., a UE). An event triggered at the second apparatus 504 (at time T21) is after the report at time T12 which is requested at time T11 by the first apparatus 502. The resource for the report at time T11 has a relatively large payload (e.g., a long PUCCH or a long PUSCH). For example, the first apparatus 502 may have requested that the second apparatus 504 send a report using the long PUCCH or the long PUSCH.

Time T21 and time T11 are relatively close to each other in this scenario. The network may specify that the event-triggered report might not need to be sent (or might be modified) if the event occurs within a certain amount of time since the time T12 report. For example, when the absolute value of T21 minus T11 is less than a threshold (e.g., abs(T21−T11)<a threshold).

An event-triggered report might not need to be sent in this scenario because the report at time T12 might have sent all of the information that would be sent in the event-triggered report. Alternatively, the event-triggered report could be modified (e.g., the payload shortened) to prevent retransmission of any information sent in the time T12 report.

Figure 6:
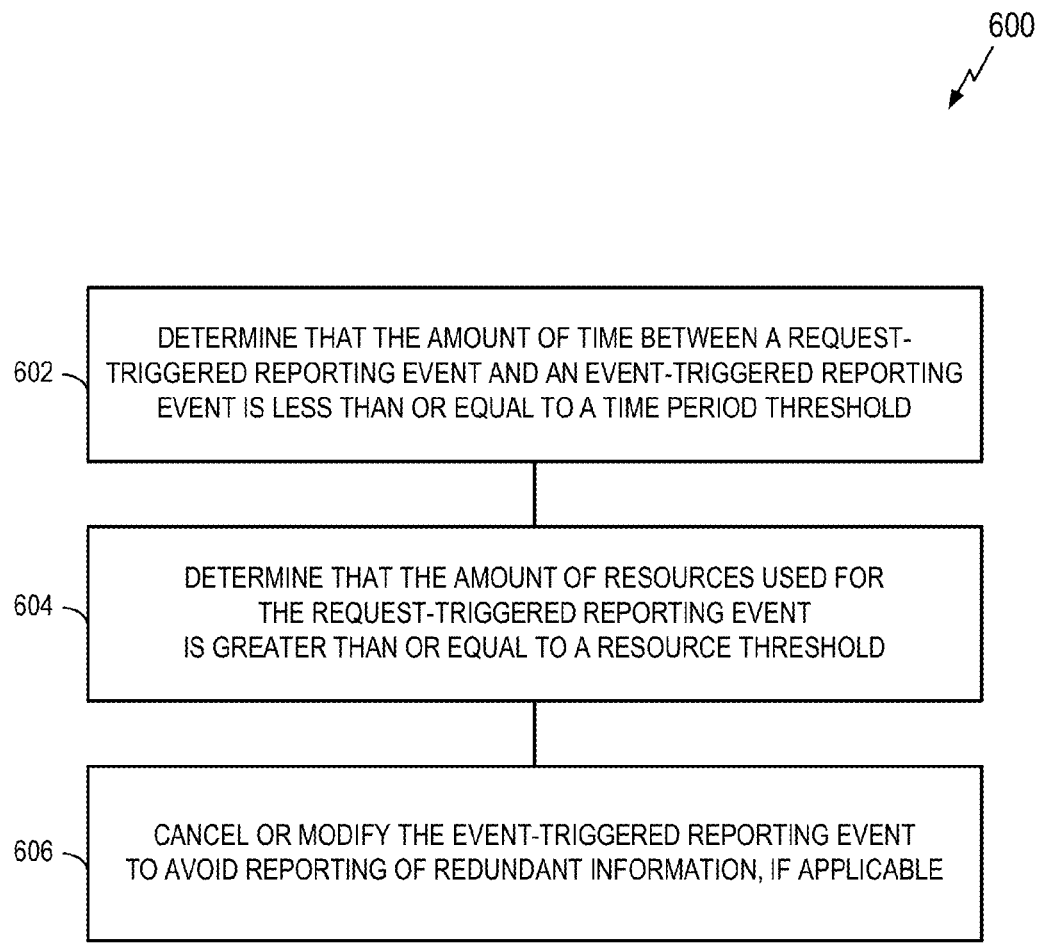
FIG. 6 is a flowchart illustrating an example of a reporting process in accordance with the second reporting scenario of FIG. 5.

FIG. 6 illustrates a process 600 for communication in accordance with some aspects of the second scenario 500. The process 600 may take place within a processing circuit (e.g., the processing circuit 1710 of FIG. 17), which may be located in a UE, a TRP, a BS, an eNB, a gNB, or some other suitable apparatus. Of course, in various aspects within the scope of the disclosure, the process 600 may be implemented by any suitable apparatus capable of supporting communication-related operations.

At block 602, an apparatus (e.g., a UE, an eNB, or a gNB) determines that the amount of time between a request-triggered reporting event and an event-triggered reporting event is less than or equal to a time period threshold.

At block 604, the apparatus determines that the amount of resources used for the request-triggered reporting event is greater than or equal to a resource threshold.

At block 606, the apparatus cancels or modifies the event-triggered reporting event to avoid reporting of redundant information, if applicable.

In some aspects, the process 600 may include any combination of the above operations and/or features.

Third Scenario

Figure 7:
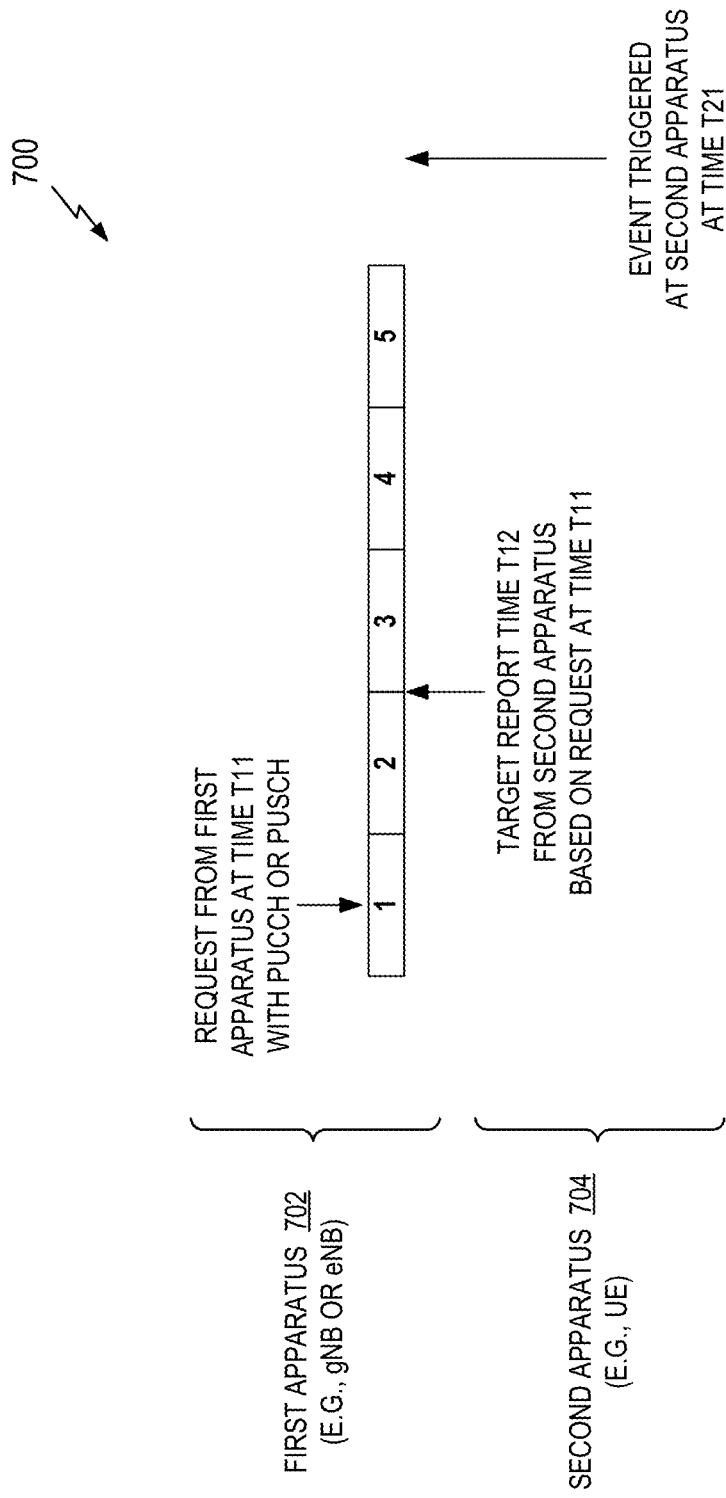
FIG. 7 illustrates a third reporting scenario in accordance with some aspects of the disclosure.

FIG. 7 illustrates a third scenario 700 (Case 1c) where a first apparatus 702 (e.g., a gNB or an eNB) communicates with a second apparatus 704 (e.g., a UE). An event triggered at the second apparatus 704 (at time T21) is after the report at time T12 which is requested at time T11 by the first apparatus 702. The resource for the report at time T11 has a relatively large payload (e.g., a long PUCCH or a long PUSCH).

Time T21 and time T11 are relatively far away from each other in this scenario. For example abs(T21−T11)>a threshold. Thus, the event-triggered report might not be redundant of the report sent at time T12. For example, the network may specify that the event-triggered report should be sent if a certain amount of time has passed since the time T12 report.

Figure 8:
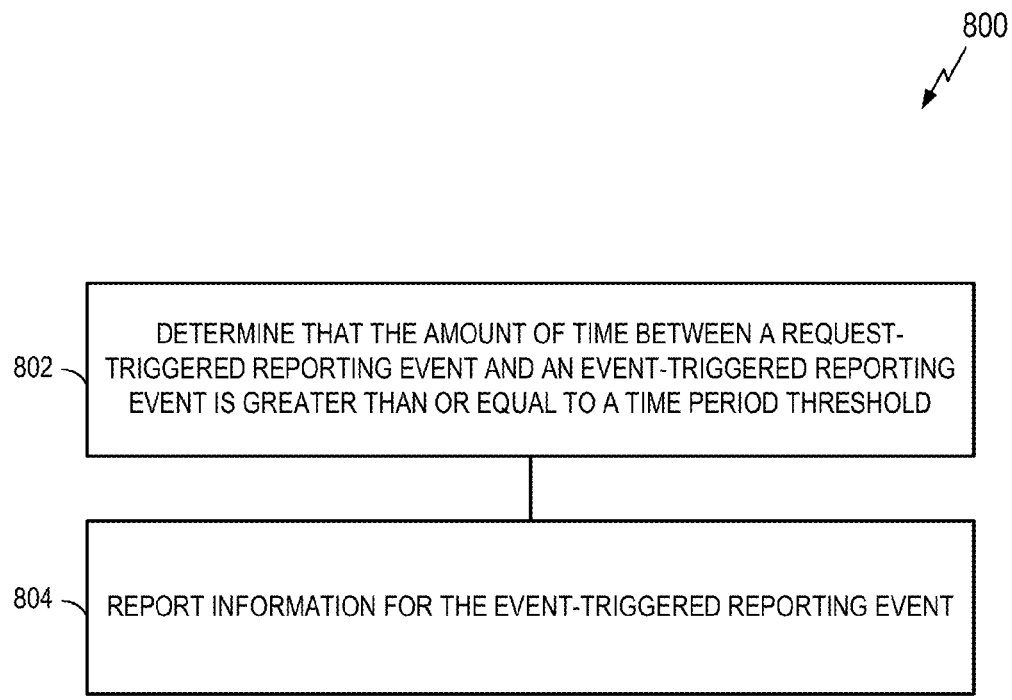
FIG. 8 is a flowchart illustrating an example of a reporting process in accordance with the third reporting scenario of FIG. 7.

FIG. 8 illustrates a process 800 for communication in accordance with some aspects of the third scenario 700. The process 800 may take place within a processing circuit (e.g., the processing circuit 1710 of FIG. 17), which may be located in a UE, a TRP, a BS, an eNB, a gNB, or some other suitable apparatus. Of course, in various aspects within the scope of the disclosure, the process 800 may be implemented by any suitable apparatus capable of supporting communication-related operations.

At block 802, an apparatus (e.g., a UE, an eNB, or a gNB) determines that the amount of time between a request-triggered reporting event and an event-triggered reporting event is greater than or equal to a time period threshold.

At block 804, the apparatus reports information for the event-triggered reporting event. In this case, the event-triggered reporting might not be modified.

In some aspects, the process 800 may include any combination of the above operations and/or features.

Fourth Scenario

Figure 9:
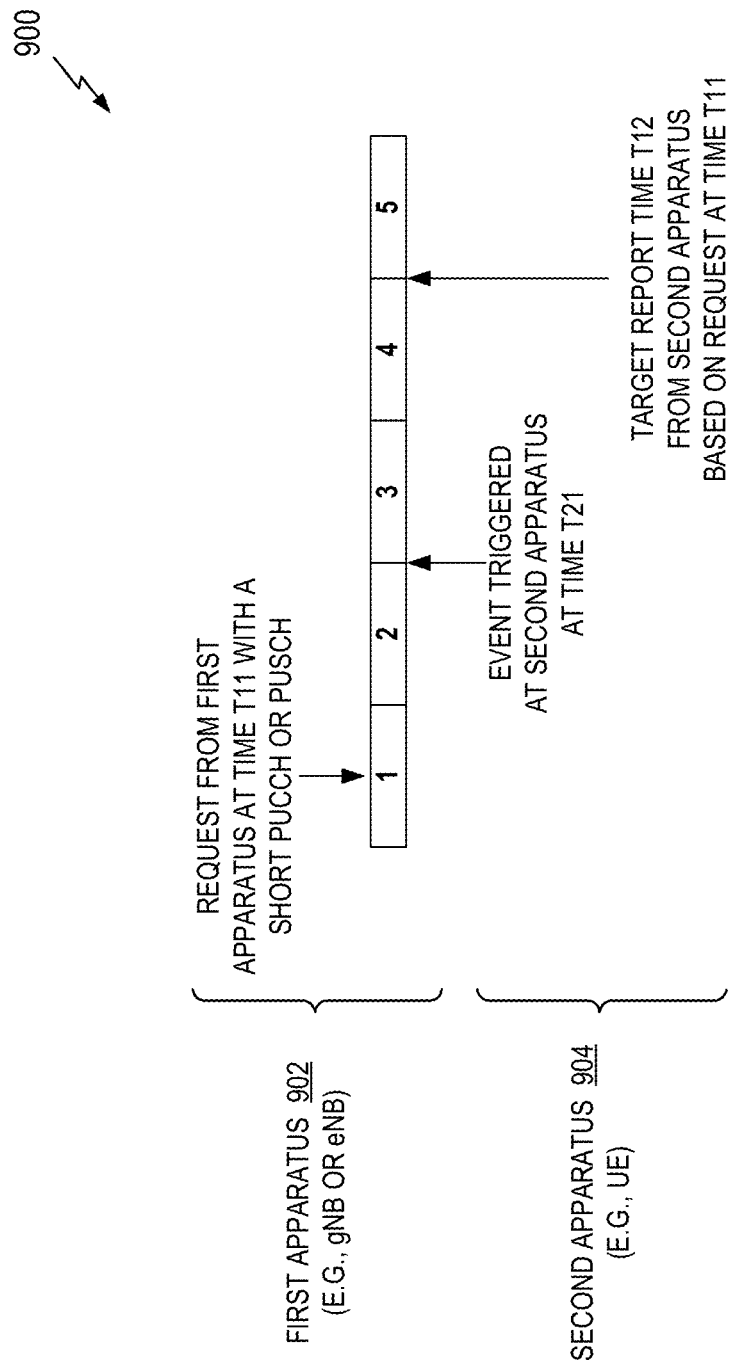
FIG. 9 illustrates a fourth reporting scenario in accordance with some aspects of the disclosure.

FIG. 9 illustrates a fourth scenario 900 (Case 2a) where a first apparatus 902 (e.g., a gNB or an eNB) communicates with a second apparatus 904 (e.g., a UE). An event triggered at the second apparatus 904 (at time T21) is before the report at time T12 which is requested at time T11 by the first apparatus 902. The resource for the report at time T12 has a relatively limited payload (e.g., a short PUCCH or a short PUSCH).

In this case, the time T12 report is probably not be large enough to carry all of the report information (e.g., including the information for the event-triggered report). Thus, the second apparatus 904 may still send the event-triggered report. However, the second apparatus 904 may determine whether the reports are redundant in any respect and take action as discussed herein accordingly (e.g., reduce the payload of the event-triggered report).

Figure 10:
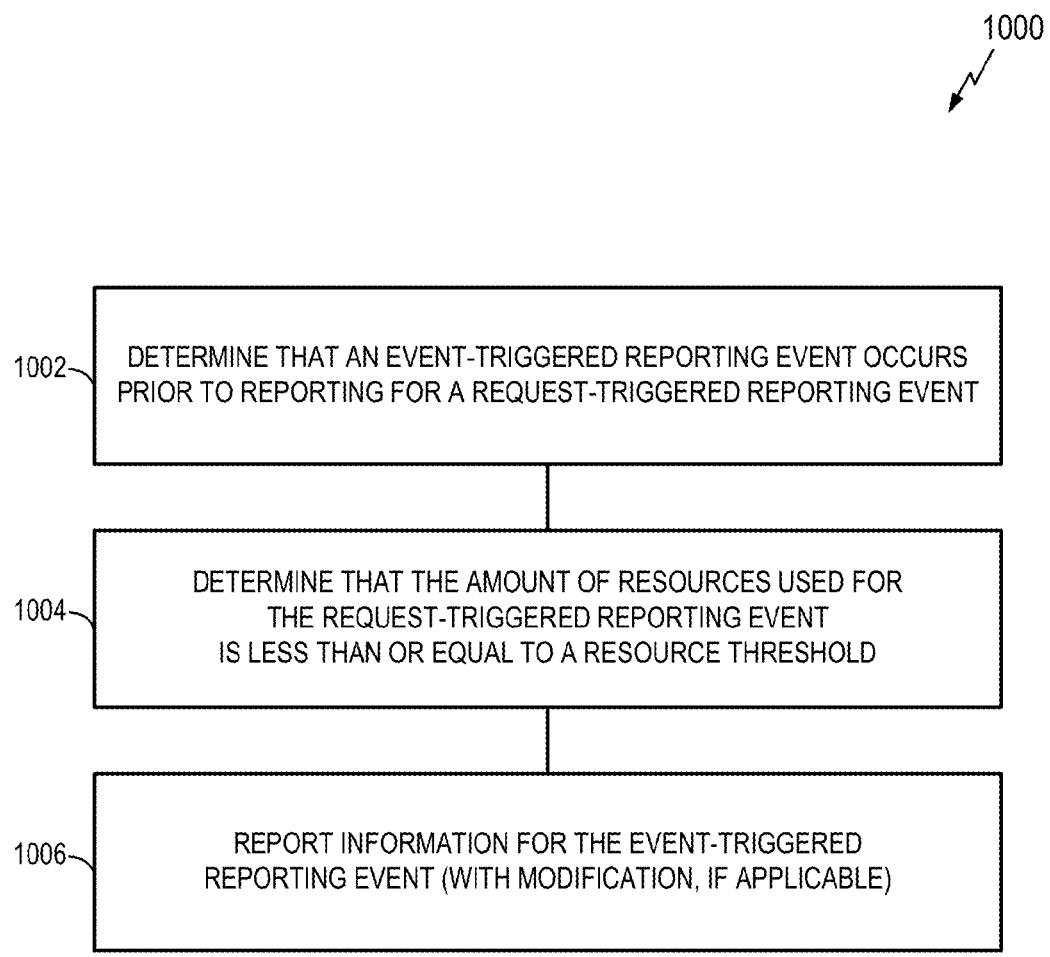
FIG. 10 is a flowchart illustrating an example of a reporting process in accordance with the fourth reporting scenario of FIG. 9.

FIG. 10 illustrates a process 1000 for communication in accordance with some aspects of the fourth scenario 900. The process 1000 may take place within a processing circuit (e.g., the processing circuit 1710 of FIG. 17), which may be located in a UE, a TRP, a BS, an eNB, a gNB, or some other suitable apparatus. Of course, in various aspects within the scope of the disclosure, the process 1000 may be implemented by any suitable apparatus capable of supporting communication-related operations.

At block 1002, an apparatus (e.g., a UE, an eNB, or a gNB) determines that an event-triggered reporting event occurs prior to reporting for a request-triggered reporting event.

At block 1004, the apparatus determines that the amount of resources used for the request-triggered reporting event is less than or equal to a resource threshold.

At block 1006, the apparatus reports information for the event-triggered reporting event (with modification, if applicable).

In some aspects, the process 1000 may include any combination of the above operations and/or features.

Fifth Scenario

Figure 11:
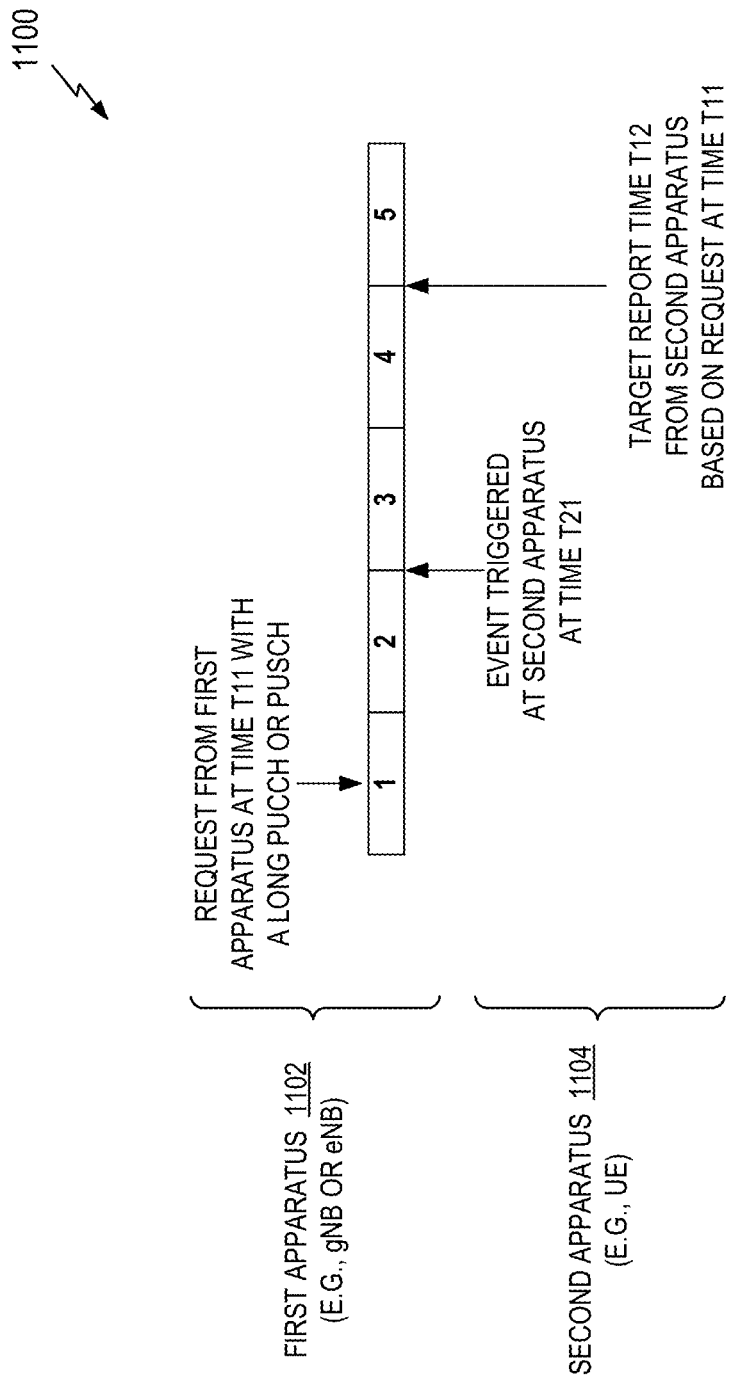
FIG. 11 illustrates a fifth reporting scenario in accordance with some aspects of the disclosure.

FIG. 11 illustrates a fifth scenario 1100 (Case 2b) where a first apparatus 1102 (e.g., a gNB or an eNB) communicates with a second apparatus 1104 (e.g., a UE). An event triggered at the second apparatus 1104 (at time T21) is before the report at time T12 which is requested at time T11 by the first apparatus 1102. The resource for the report at time T11 has a relatively large payload (e.g., a long PUCCH or a long PUSCH).

In this case, the time T12 report may have a sufficient payload size for all of the report information (including the information for the event-triggered report). Thus, the second apparatus 1104 may cancel the event-triggered report (or otherwise reduce the payload of that report).

Figure 12:
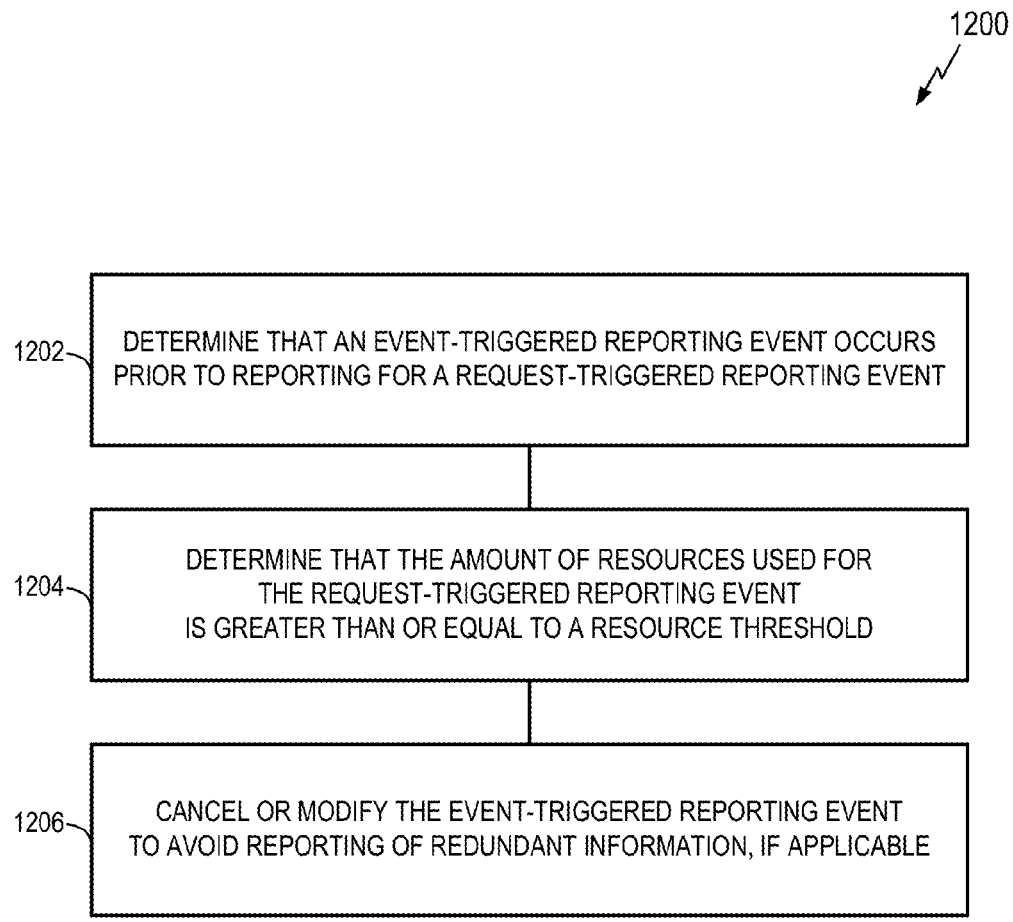
FIG. 12 is a flowchart illustrating an example of a reporting process in accordance with the fifth reporting scenario of FIG. 11.

FIG. 12 illustrates a process 1200 for communication in accordance with some aspects of the fifth scenario 1100. The process 1200 may take place within a processing circuit (e.g., the processing circuit 1710 of FIG. 17), which may be located in a UE, a TRP, a BS, an eNB, a gNB, or some other suitable apparatus. Of course, in various aspects within the scope of the disclosure, the process 1200 may be implemented by any suitable apparatus capable of supporting communication-related operations.

At block 1202, an apparatus (e.g., a UE, an eNB, or a gNB) determines that an event-triggered reporting event occurs prior to reporting for a request-triggered reporting event.

At block 1204, the apparatus determines that the amount of resources used for the request-triggered reporting event is greater than or equal to a resource threshold.

At block 1206, the apparatus cancels or modifies the event-triggered reporting event to avoid reporting of redundant information, if applicable.

In some aspects, the process 1200 may include any combination of the above operations and/or features.

Sixth Scenario

Figure 13:
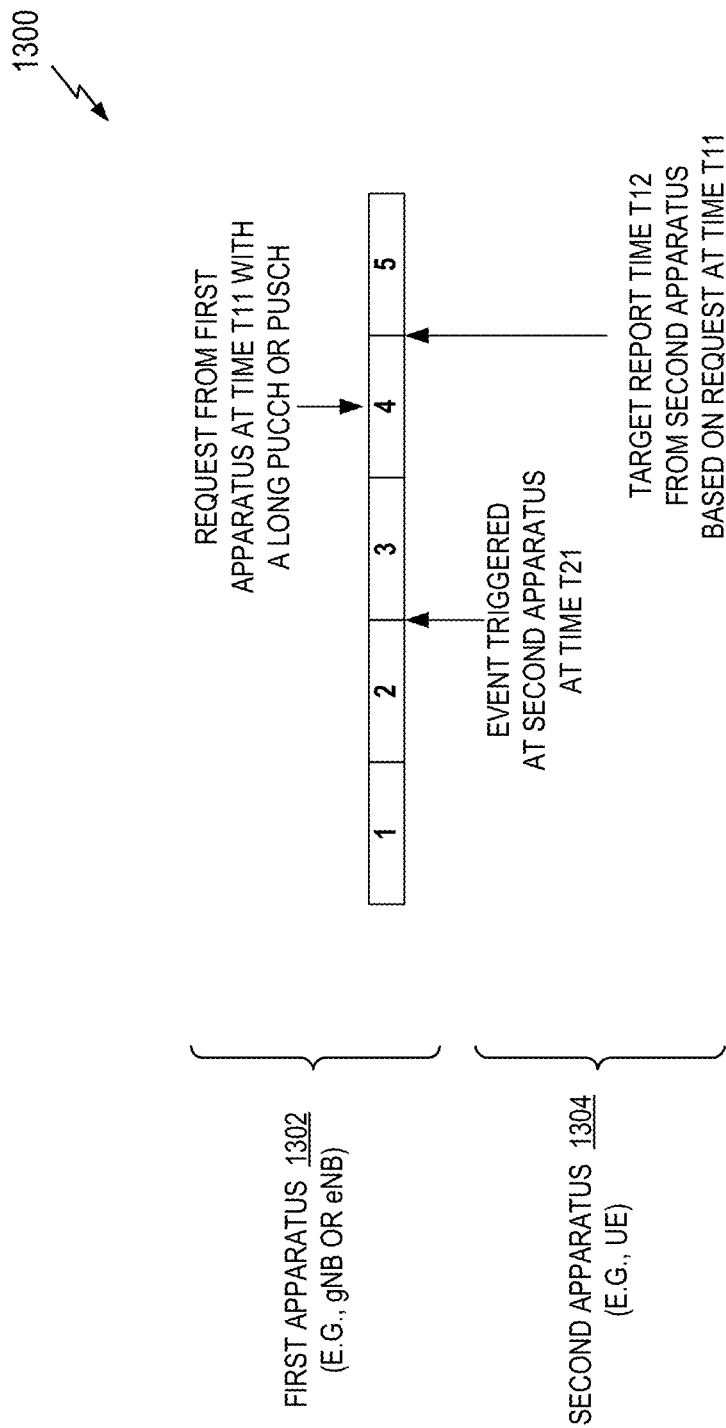
FIG. 13 illustrates a sixth reporting scenario in accordance with some aspects of the disclosure.

FIG. 13 illustrates a sixth scenario 1300 (Case 3) where a first apparatus 1302 (e.g., a gNB or an eNB) communicates with a second apparatus 1304 (e.g., a UE). An event triggered at the second apparatus 1304 (at time T21) is before time T12 (the report) and time T11 (the request from the first apparatus 1302). In this case, the second apparatus 1304 may cancel or adjust (e.g., reduce the payload of) the event-triggered report depending on whether the time T12 report can carry the information that would otherwise be carried by the event-triggered report (e.g., which can be scheduled after time T12).

Figure 14:
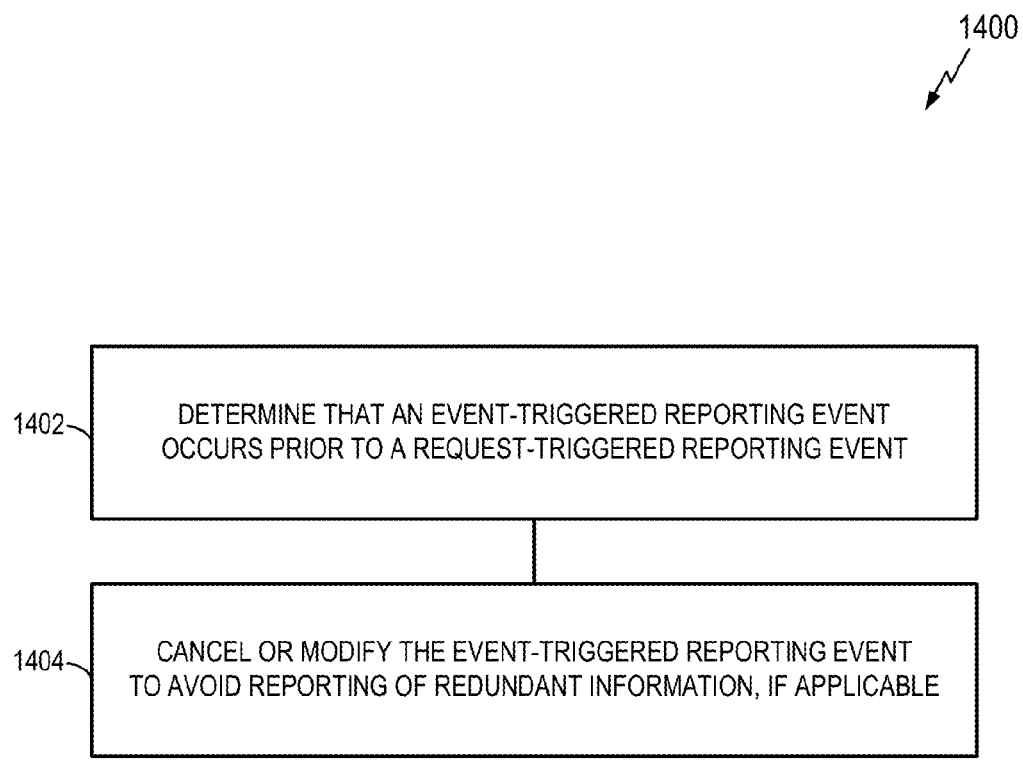
FIG. 14 is a flowchart illustrating an example of a reporting process in accordance with the sixth reporting scenario of FIG. 13.

FIG. 14 illustrates a process 1400 for communication in accordance with some aspects of the sixth scenario 1300. The process 1400 may take place within a processing circuit (e.g., the processing circuit 1710 of FIG. 17), which may be located in a UE, a TRP, a BS, an eNB, a gNB, or some other suitable apparatus. Of course, in various aspects within the scope of the disclosure, the process 1400 may be implemented by any suitable apparatus capable of supporting communication-related operations.

At block 1402, an apparatus (e.g., a UE, an eNB, or a gNB) determines that an event-triggered reporting event occurs prior to a request-triggered reporting event.

At block 1404, the apparatus cancels or modifies the event-triggered reporting event to avoid reporting of redundant information, if applicable.

In some aspects, the process 1400 may include any combination of the above operations and/or features.

Periodic Reports

Figure 15:
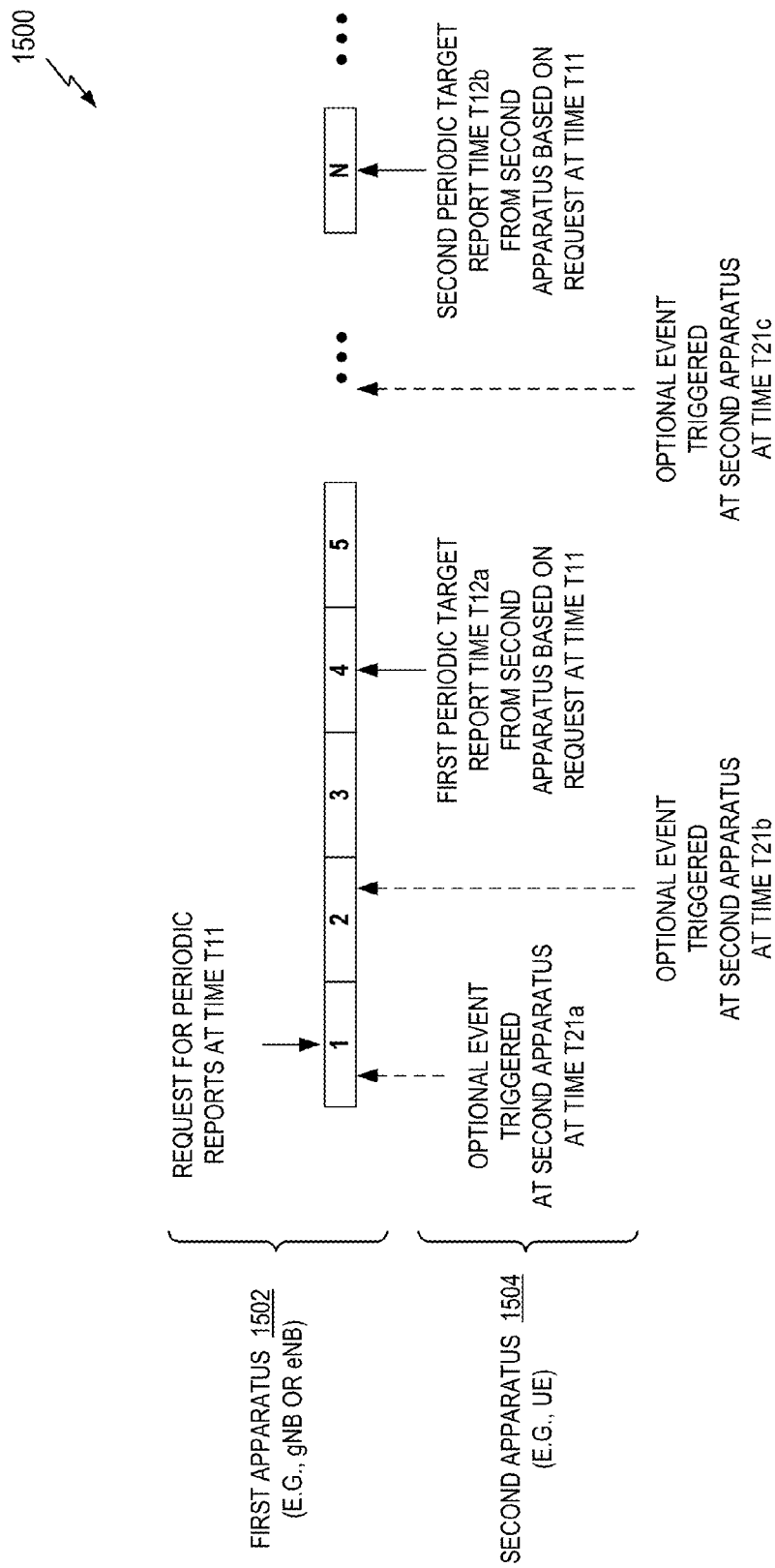
FIG. 15 illustrates periodic reporting scenarios in accordance with some aspects of the disclosure.

FIG. 15 illustrates a scenario 1500 where a first apparatus 1502 (e.g., a gNB or an eNB) requests periodic reports from a second apparatus 1504 (e.g., a UE). For example, a request from the first apparatus 1502 at time T11 may trigger period reports at time T12a, time T12b, and so on. An event triggered at the second apparatus 1504 may be before time T11 (e.g., at time T21a), after time T11 and before time T12a (e.g., at time T21b), after time T12a (e.g., at time T21c), or at some other time. In this case, the second apparatus 1504 may allow, cancel, or adjust (e.g., reduce the payload of) any of the periodic event-triggered reports depending on any of the scenarios discussed herein (e.g., based on whether a time T12 report can carry the information that would otherwise be carried by a periodic event-triggered report).

Controlling Reporting Based on Timing

The disclosure relates in some aspects to not triggering a service request (SR) for an uplink resource request due to an event trigger for certain situations. For example, an SR might not be triggered in the second scenario (Case 1b). As another example, an SR might not be triggered in the fifth scenario (Case 2b) if the uplink grant for the receiver has sufficient resources to carry all of the report information.

In some aspects, if a report request from a transmitter and an event-triggered report at a receiver happen within a defined time window, the receiver may determine whether to transmit an uplink resource request for the event-triggered report. In some aspects, this determination may be based on the amount of information in the report (e.g., if the requested report was for a large amount of information, the event-triggered report may be redundant). In some aspects, this determination may be based on the type of report requested by the transmitter (e.g., if the requested report was for the same type of information that is provided by an event triggered report, the event-triggered report may be redundant).

A time window can be specified by using a time delta between time T11 and time T21 or between time T12 and time T21. Here, time T11 is the report request time, time T12 is the targeted transmission time, and time T21 is the event-triggered time.

In the event a transmission associated with an event trigger is not transmitted, a timer can be specified to determine when to restart the transmission of uplink resource requests.

Example Beamforming System

Figure 16:
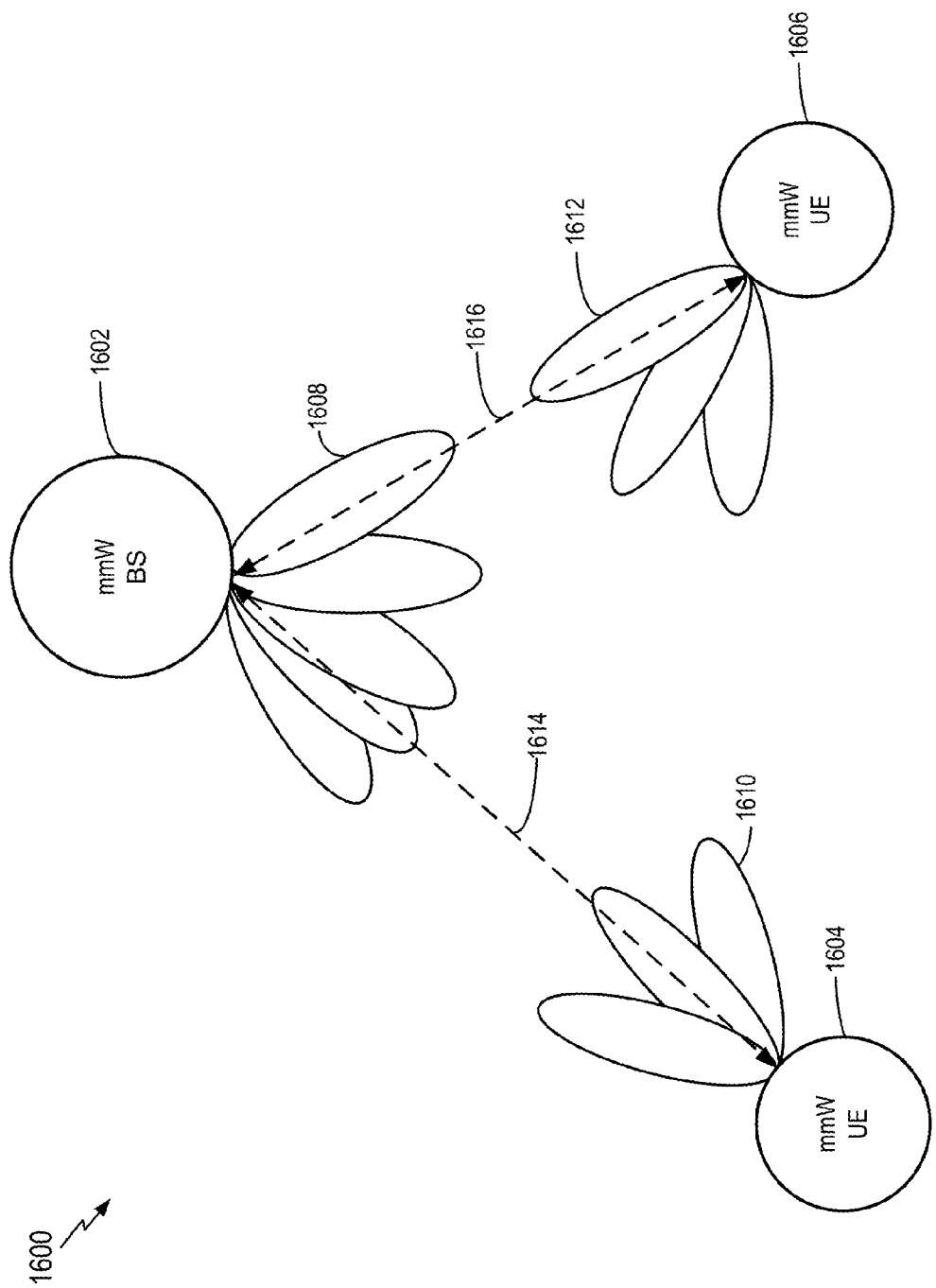
FIG. 16 illustrates an example communication system employing beamforming within which aspects of the disclosure may be implemented.

FIG. 16 illustrates an example of a wireless communication system 1600 in which aspects of the present disclosure may be employed. In the communication system 1600, a millimeter wave base station (mmW BS) 1602 communicates with a first UE 1604 and a second UE 1606 via different beamforming directions. As indicated by a set of beams 1608, the mmW BS 1602 may communicate via any one of a plurality of directional beams. As indicated by a set of beams 1610, the first UE 1604 may communicate via any one of a plurality of directional beams. As indicated by a set of beams 1612, the second UE 1606 may communicate via any one of a plurality of directional beams. For example, the mmW BS 1602 may communicate with the first UE 1604 via a first beamforming direction 1614 and communicate with the second UE 1606 via a second beamforming direction 1616.

A wireless MIMO system may use multiple transmit antennas to provide beamforming-based signal transmission. Typically, beamforming-based signals transmitted from different antennas are adjusted in phase (and optionally amplitude) such that the resulting signal power is focused toward a receiver device (e.g., an access terminal).

A wireless MIMO system may support communication for a single user at a time or for several users concurrently. Transmissions to a single user (e.g., a single receiver device) are commonly referred to as single-user MIMO (SU-MIMO), while concurrent transmissions to multiple users are commonly referred to as multi-user MIMO (MU-MIMO).

A mmW BS of a MIMO system may use multiple antennas for data transmission and reception, while each UE employs one or more antennas. The mmW BS communicates with the UEs via forward link channels and reverse link channels. In some aspects, a downlink (DL) channel refers to a communication channel from a transmit antenna of the access point to a receive antenna of a UE, and an uplink (UL) channel refers to a communication channel from a transmit antenna of a UE to a receive antenna of the mmW BS. Downlink and uplink may be referred to as forward link and reverse link, respectively.

MIMO channels corresponding to transmissions from a set of transmit antennas to a receive antenna are referred to spatial streams since precoding (e.g., beamforming) is employed to direct the transmissions toward the receive antenna. Consequently, in some aspects, each spatial stream corresponds to at least one dimension. A MIMO system thus provides improved performance (e.g., higher throughput and/or greater reliability) through the use of the additional dimensionalities provided by these spatial streams.

Example Apparatus

Figure 17:
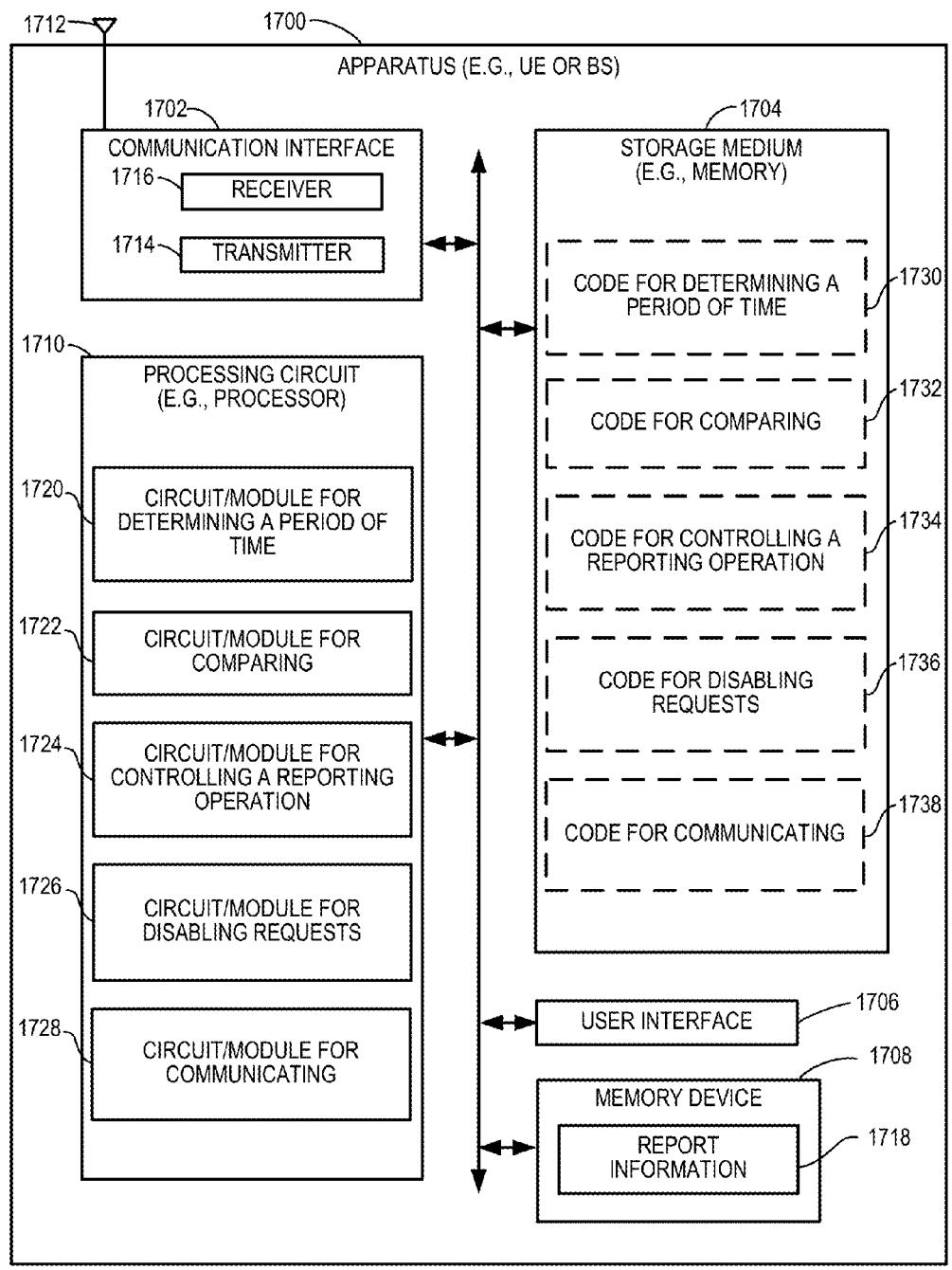
FIG. 17 is a block diagram illustrating an example hardware implementation for an apparatus (e.g., an electronic device) that can support communication in accordance with some aspects of the disclosure.

FIG. 17 illustrates a block diagram of an example hardware implementation of an apparatus 1700 configured to communicate according to one or more aspects of the disclosure. The apparatus 1700 could embody or be implemented within a UE, a TRP, a base station (BS), an eNode B (eNB), a gNode B (gNB), or some other type of device that supports wireless communication. In various implementations, the apparatus 1700 could embody or be implemented within an access terminal, an access point, or some other type of device. In various implementations, the apparatus 1700 could embody or be implemented within a mobile phone, a smart phone, a tablet, a portable computer, a server, a network entity, a personal computer, a sensor, an alarm, a vehicle, a machine, an entertainment device, a medical device, or any other electronic device having circuitry.

The apparatus 1700 includes a communication interface (e.g., at least one transceiver) 1702, a storage medium 1704, a user interface 1706, a memory device (e.g., a memory circuit) 1708, and a processing circuit 1710 (e.g., at least one processor). In various implementations, the user interface 1706 may include one or more of: a keypad, a display, a speaker, a microphone, a touchscreen display, of some other circuitry for receiving an input from or sending an output to a user.

These components can be coupled to and/or placed in electrical communication with one another via a signaling bus or other suitable component, represented generally by the connection lines in FIG. 17. The signaling bus may include any number of interconnecting buses and bridges depending on the specific application of the processing circuit 1710 and the overall design constraints. The signaling bus links together various circuits such that each of the communication interface 1702, the storage medium 1704, the user interface 1706, and the memory device 1708 are coupled to and/or in electrical communication with the processing circuit 1710. The signaling bus may also link various other circuits (not shown) such as timing sources, peripherals, voltage regulators, and power management circuits, which are well known in the art, and therefore, will not be described any further.

The communication interface 1702 provides a means for communicating with other apparatuses over a transmission medium. In some implementations, the communication interface 1702 may be adapted to facilitate wireless communication of the apparatus 1700. For example, the communication interface 1702 may include circuitry and/or programming adapted to facilitate the communication of information bi-directionally with respect to one or more communication devices in a network. Thus, in some implementations, the communication interface 1702 may be coupled to one or more antennas 1712 as shown in FIG. 17 for wireless communication within a wireless communication system. In some implementations, the communication interface 1702 may be configured for wire-based communication. For example, the communication interface 1702 could be a bus interface, a send/receive interface, or some other type of signal interface including drivers, buffers, or other circuitry for outputting and/or obtaining signals (e.g., outputting signal from and/or receiving signals into an integrated circuit). The communication interface 1702 can be configured with one or more standalone receivers and/or transmitters, as well as one or more transceivers. In the illustrated example, the communication interface 1702 includes a transmitter 1714 and a receiver 1716. The communication interface 1702 serves as one example of a means for receiving and/or means transmitting.

The memory device 1708 may represent one or more memory devices. As indicated, the memory device 1708 may maintain report information 1718 along with other information used by the apparatus 1700. In some implementations, the memory device 1708 and the storage medium 1704 are implemented as a common memory component. The memory device 1708 may also be used for storing data that is manipulated by the processing circuit 1710 or some other component of the apparatus 1700.

The storage medium 1704 may represent one or more computer-readable, machine-readable, and/or processor-readable devices for storing programming, such as processor executable code or instructions (e.g., software, firmware), electronic data, databases, or other digital information. The storage medium 1704 may also be used for storing data that is manipulated by the processing circuit 1710 when executing programming. The storage medium 1704 may be any available media that can be accessed by a general purpose or special purpose processor, including portable or fixed storage devices, optical storage devices, and various other mediums capable of storing, containing or carrying programming.

By way of example and not limitation, the storage medium 1704 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 1704 may be embodied in an article of manufacture (e.g., a computer program product). By way of example, a computer program product may include a computer-readable medium in packaging materials. In view of the above, in some implementations, the storage medium 1704 may be a non-transitory (e.g., tangible) storage medium.

The storage medium 1704 may be coupled to the processing circuit 1710 such that the processing circuit 1710 can read information from, and write information to, the storage medium 1704. That is, the storage medium 1704 can be coupled to the processing circuit 1710 so that the storage medium 1704 is at least accessible by the processing circuit 1710, including examples where at least one storage medium is integral to the processing circuit 1710 and/or examples where at least one storage medium is separate from the processing circuit 1710 (e.g., resident in the apparatus 1700, external to the apparatus 1700, distributed across multiple entities, etc.).

Programming stored by the storage medium 1704, when executed by the processing circuit 1710, causes the processing circuit 1710 to perform one or more of the various functions and/or process operations described herein. For example, the storage medium 1704 may include operations configured for regulating operations at one or more hardware blocks of the processing circuit 1710, as well as to utilize the communication interface 1702 for wireless communication utilizing their respective communication protocols.

The processing circuit 1710 is generally adapted for processing, including the execution of such programming stored on the storage medium 1704. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1710 is arranged to obtain, process and/or send data, control data access and storage, issue commands, and control other desired operations. The processing circuit 1710 may include circuitry configured to implement desired programming provided by appropriate media in at least one example. For example, the processing circuit 1710 may be implemented as one or more processors, one or more controllers, and/or other structure configured to execute executable programming Examples of the processing circuit 1710 may include a general purpose processor, a digital signal processor (DSP), an application-specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1710 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1710 are for illustration and other suitable configurations within the scope of the disclosure are also contemplated.

According to one or more aspects of the disclosure, the processing circuit 1710 may be adapted to perform any or all of the features, processes, functions, operations and/or routines for any or all of the apparatuses described herein. For example, the processing circuit 1710 may be configured to perform any of the steps, functions, and/or processes described with respect to FIGS. 1-16, 18, and 19. As used herein, the term "adapted" in relation to the processing circuit 1710 may refer to the processing circuit 1710 being one or more of configured, employed, implemented, and/or programmed to perform a particular process, function, operation and/or routine according to various features described herein.

The processing circuit 1710 may be a specialized processor, such as an application-specific integrated circuit (ASIC) that serves as a means for (e.g., structure for) carrying out any one of the operations described in conjunction with FIGS. 1-16, 18, and 19. The processing circuit 1710 serves as one example of a means for transmitting and/or a means for receiving. In various implementations, the processing circuit 1710 may incorporate the functionality of the first apparatus 202 (e.g., the report controller 210) or the second apparatus 204 (e.g., the report controller 214) of FIG. 2.

According to at least one example of the apparatus 1700, the processing circuit 1710 may include one or more of a circuit/module for determining a period of time 1720, a circuit/module for comparing 1722, a circuit/module for controlling a reporting operation 1724, a circuit/module for disabling requests 1726, or a circuit/module for communicating 1728. In various implementations, the circuit/module for determining a period of time 1720, the circuit/module for comparing 1722, the circuit/module for controlling a reporting operation 1724, the circuit/module for disabling requests 1726, or the circuit/module for communicating 1728 may correspond, at least in part, to the functionality of the first apparatus 202 (e.g., the report controller 210) or the second apparatus 204 (e.g., the report controller 214) of FIG. 2.

As mentioned above, programming stored by the storage medium 1704, when executed by the processing circuit 1710, causes the processing circuit 1710 to perform one or more of the various functions and/or process operations described herein. For example, the programming may cause the processing circuit 1710 to perform the various functions, steps, and/or processes described herein with respect to FIGS. 1-16, 18, and 19 in various implementations. As shown in FIG. 17, the storage medium 1704 may include one or more of code for determining a period of time 1730, code for comparing 1732, code for controlling a reporting operation 1734, code for disabling requests 1736, or code for communicating 1738. In various implementations, the code for determining a period of time 1730, the code for comparing 1732, the code for controlling a reporting operation 1734, the code for disabling requests 1736, or the code for communicating 1738 may be executed or otherwise used to provide the functionality described herein for the circuit/module for determining a period of time 1720, the circuit/module for comparing 1722, the circuit/module for controlling a reporting operation 1724, the circuit/module for disabling requests 1726, or the circuit/module for communicating 1728.

The circuit/module for determining a period of time 1720 may include circuitry and/or programming (e.g., code for determining a period of time 1730 stored on the storage medium 1704) adapted to perform several functions relating to, for example, determining the distance in time between two events. In some aspects, the circuit/module for determining a period of time 1720 (e.g., a means for determining a period of time) may correspond to, for example, a processing circuit.

In one scenario, the circuit/module for determining a period of time 1720 determines a period of time between a first reporting event associated with request-triggered reporting and a second reporting event associated with event-triggered reporting. In this case, the circuit/module for determining a period of time 1720 determines the time of the first reporting event and the time of the second reporting event (e.g., by obtaining information from the memory device 1708, or some other component of the apparatus 1700). The circuit/module for determining a period of time 1720 then calculates the difference between these times (e.g., by performing a subtraction operation). The circuit/module for determining a period of time 1720 may then output the result of this determination (e.g., to the circuit/module for comparing 1722, the memory device 1708, or some other component).

The circuit/module for comparing 1722 may include circuitry and/or programming (e.g., code for comparing 1732 stored on the storage medium 1704) adapted to perform several functions relating to, for example, comparing two values. In some aspects, the circuit/module for comparing 1722 (e.g., a means for comparing) may correspond to, for example, a processing circuit.

In one scenario, the circuit/module for comparing 1740 compares a period of time with a threshold. In this case, the circuit/module for comparing 1740 obtains an indication of the period of time (e.g., from the circuit/module for determining a period of time 1720, the memory device 1708, or some other component of the apparatus 1700) and the threshold value (e.g., from the memory device 1708, or some other component of the apparatus 1700). The circuit/module for comparing 1740 then determines whether the period of time is larger than the threshold (e.g., by performing a subtraction operation). The circuit/module for comparing 1740 may then output the result of this determination (e.g., to the circuit/module for controlling a reporting operation 1724, the memory device 1708, or some other component).

The circuit/module for controlling a reporting operation 1724 may include circuitry and/or programming (e.g., code for controlling a reporting operation 1734 stored on the storage medium 1704) adapted to perform several functions relating to, for example, controlling a reporting operation for the apparatus 1700. In some aspects, the circuit/module for controlling a reporting operation 1724 (e.g., a means for controlling a reporting operation) may correspond to, for example, a processing circuit.

In one scenario, the circuit/module for controlling a reporting operation 1724 controls a reporting operation according to a result of a comparison. In this case, the circuit/module for controlling a reporting operation 1724 obtains an indication of the comparison (e.g., from the circuit/module for comparing 1722, the memory device 1708, or some other component of the apparatus 1700). The circuit/module for controlling a reporting operation 1724 then determines how to control the reporting operation (e.g., by canceling an operation if the comparison is TRUE). The circuit/module for controlling a reporting operation 1724 may then output an appropriate control signal (e.g., a control data value) to affect how the apparatus 1700 does its reporting.

The circuit/module for disabling requests 1726 may include circuitry and/or programming (e.g., code for disabling requests 1736 stored on the storage medium 1704) adapted to perform several functions relating to, for example, controlling service requests. In some aspects, the circuit/module for disabling requests 1726 (e.g., a means for disabling requests) may correspond to, for example, a processing circuit.

In one scenario, the circuit/module for disabling requests 1726 disables requests for a period of time in response to an election to not send a service request. In this case, the circuit/module for disabling requests 1726 obtains an indication of the election (e.g., from the circuit/module for controlling a reporting operation 1724, the memory device 1708, or some other component of the apparatus 1700). The circuit/module for disabling requests 1726 may then start a timer and output an appropriate control signal (e.g., a flag) to prevent certain service requests while the timer is running.

The circuit/module for communicating 1728 may include circuitry and/or programming (e.g., code for communicating 1738 stored on the storage medium 1704) adapted to perform several functions relating to, for example, communicating information. In some implementations, the communication involves receiving the information. In some implementations, the communication involves sending (e.g., transmitting) the information.

In some implementations where the communicating involves receiving information, the circuit/module for communicating 1728 receives information (e.g., from the communication interface 1702, the receiver 1716, the memory device 1708, some other component of the apparatus 1700, or some other device), processes (e.g., decodes) the information, and outputs the information to another component of the apparatus 1700 (e.g., the memory device 1708 or some other component). In some scenarios (e.g., if the circuit/module for communicating 1728 includes a receiver), the communicating involves the circuit/module for communicating 1728 receiving information directly from a device that transmitted the information (e.g., via radio frequency signaling or some other type of signaling suitable for the applicable communication medium).

In some implementations where the communicating involves sending information, the circuit/module for communicating 1728 obtains information (e.g., from the memory device 1708 or some other component of the apparatus 1700), processes (e.g., encodes) the information, and outputs the processed information. In some scenarios, the communicating involves sending the information to another component of the apparatus 1700 (e.g., the transmitter 1714, the communication interface 1702, or some other component) that will transmit the information to another device. In some scenarios (e.g., if the circuit/module for communicating 1728 includes a transmitter), the communicating involves the circuit/module for communicating 1728 transmitting the information directly to another device (e.g., the ultimate destination) via radio frequency signaling or some other type of signaling suitable for the applicable communication medium.

The circuit/module for communicating 1728 (e.g., a means for communicating) may take various forms. In some aspects, the circuit/module for communicating 1728 may correspond to, for example, an interface (e.g., a bus interface, a send/receive interface, or some other type of signal interface), a communication device, a transceiver, a transmitter, a receiver, or some other similar component as discussed herein. In some implementations, the communication interface 1702 includes the circuit/module for communicating 1728 and/or the code for communicating 1738. In some implementations, the circuit/module for communicating 1728 and/or the code for communicating 1738 is configured to control the communication interface 1702 (e.g., a transceiver, a receiver, or a transmitter) to communicate the information.

Example Processes

Figure 18:
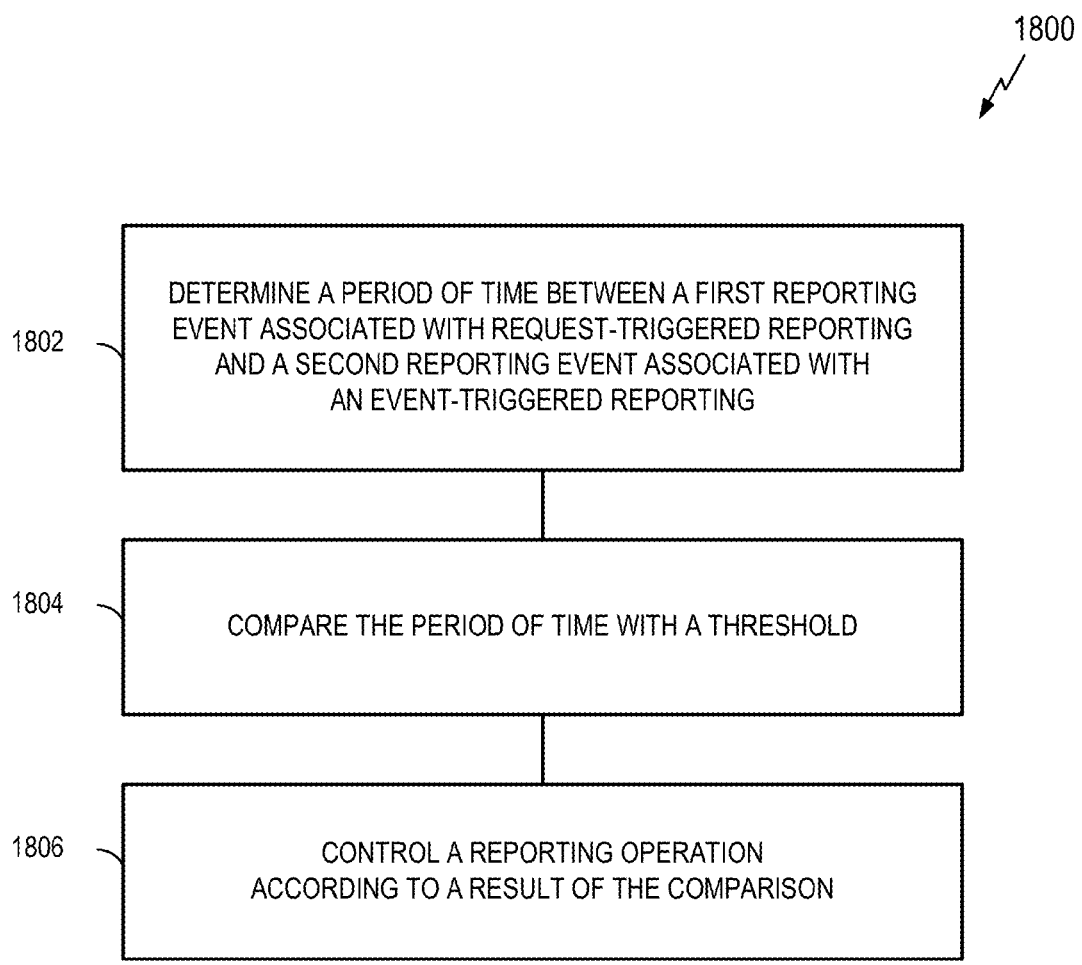
FIG. 18 is a flowchart illustrating an example of a reporting process in accordance with some aspects of the disclosure.

FIG. 18 illustrates a process 1800 for communication in accordance with some aspects of the disclosure. The process 1800 may take place within a processing circuit (e.g., the processing circuit 1710 of FIG. 17), which may be located in a UE, a BS, an eNB, a gNB, or some other suitable apparatus. Of course, in various aspects within the scope of the disclosure, the process 1800 may be implemented by any suitable apparatus capable of supporting communication-related operations.

At block 1802, an apparatus (e.g., a UE, a BS, an eNB, or a gNB) determines a period of time between a first reporting event associated with request-triggered reporting and a second reporting event associated with an event-triggered reporting.

The reporting events may take different forms in different implementations. In some aspects, the first reporting event may include receipt of a request for at least one report. In some aspects, the first reporting event may include a scheduled time to respond to a request for at least one report. In some aspects, the first reporting event may include a time of a periodic report. In some aspects, the second reporting event may include an occurrence of an event that triggers a report. In some aspects, the second reporting event may include a scheduled time to respond to an event that triggers a report.

The determination of the period of time may take different forms in different implementations. In some aspect, the determination of the period of time may include determining a difference between a first time at which a request for a report was received and a second time at which an event that triggers a report occurred. In some aspect, the determination of the period of time may include determining a difference between a first time at which a report is to be sent in response to a request and a second time at which an event that triggers a report occurred.

In some implementations, the circuit/module for determining a period of time 1720 of FIG. 17 performs the operations of block 1802. In some implementations, the code for determining a period of time 1730 of FIG. 17 is executed to perform the operations of block 1802.

At block 1804, the apparatus compares the period of time with a threshold.

In some implementations, the circuit/module for comparing 1722 of FIG. 17 performs the operations of block 1804. In some implementations, the code for comparing 1732 of FIG. 17 is executed to perform the operations of block 1804.

At block 1806, the apparatus controls a reporting operation according to a result of the comparison of block 1804.

The controlling of the reporting operation may take different forms in different implementations. In some aspects, the controlling of the reporting operation may include determining whether to send a service request for an uplink resource. In some aspects, the controlling of the reporting operation may include controlling which information is sent in a report. In some aspects, the controlling of the reporting operation may include electing to not send a report in response to an event trigger. In some aspects, the controlling of the reporting operation may include controlling which information is sent in a report in response to an event trigger. In some aspects, the controlling of the reporting operation may include electing to not send a service request for an uplink resource. In some aspects, the controlling of the reporting operation may be based on an amount of information to be reported. In some aspects, the controlling of the reporting operation may be based on a type of report requested to be sent.

In some implementations, the circuit/module for controlling a reporting operation 1724 of FIG. 17 performs the operations of block 1806. In some implementations, the code for controlling a reporting operation 1734 of FIG. 17 is executed to perform the operations of block 1806.

In some aspects, the process 1800 may include any combination of the above operations and/or features.

Figure 19:
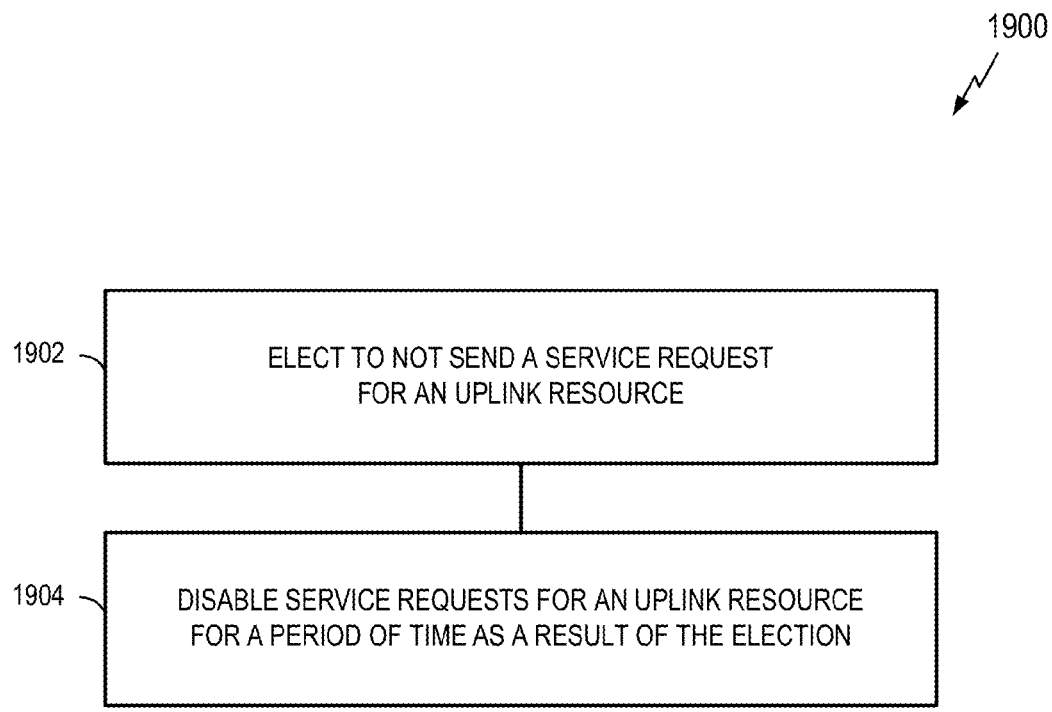
FIG. 19 is a flowchart illustrating an example of a service request process in accordance with some aspects of the disclosure.

FIG. 19 illustrates a process 1900 for communication in accordance with some aspects of the disclosure. In some aspects, the process 1900 may be performed in conjunction with (e.g., in addition to or as part of) the process 1800 of FIG. 18. The process 1900 may take place within a processing circuit (e.g., the processing circuit 1710 of FIG. 17), which may be located in a UE, a TRP, a BS, an eNB, a gNB, or some other suitable apparatus. Of course, in various aspects within the scope of the disclosure, the process 1900 may be implemented by any suitable apparatus capable of supporting communication-related operations.

At block 1902, an apparatus (e.g., a UE, an eNB, or a gNB) elects to not send a service request for an uplink resource. For example, this election may be made as a result of a decision to not send a report for an event triggered reporting event as discussed herein.

In some implementations, the circuit/module for controlling a reporting operation 1724 of FIG. 17 performs the operations of block 1902. In some implementations, the code for controlling a reporting operation 1734 of FIG. 17 is executed to perform the operations of block 1902.

At block 1904, the apparatus disables service requests for an uplink resource for a period of time as a result of the election of block 1902. In some implementations, this period of time may be configured by the network.

In some implementations, the circuit/module for disabling requests 1726 of FIG. 17 performs the operations of block 1904. In some implementations, the code for disabling requests 1736 of FIG. 17 is executed to perform the operations of block 1904.

In some aspects, the process 1900 may include any combination of the above operations and/or features.

Additional Aspects

The examples set forth herein are provided to illustrate certain concepts of the disclosure. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

As those skilled in the art will readily appreciate, various aspects described throughout this disclosure may be extended to any suitable telecommunication system, network architecture, and communication standard. By way of example, various aspects may be applied to wide area networks, peer-to-peer network, local area network, other suitable systems, or any combination thereof, including those described by yet-to-be defined standards.

Many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

One or more of the components, steps, features and/or functions illustrated in above may be rearranged and/or combined into a single component, step, feature or function or embodied in several components, steps, or functions. Additional elements, components, steps, and/or functions may also be added without departing from novel features disclosed herein. The apparatus, devices, and/or components illustrated above may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example of a storage medium is coupled to the processor such that the processor can read information from, and write information to, the storage medium. In the alternative, the storage medium may be integral to the processor.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of a, b, or c" or "a, b, or c or any combination thereof" used in the description or the claims means "a or b or c or any combination of these elements." For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

What is claimed is:

1. A method of communication, comprising:
   determining a period of time between a first reporting event associated with a request-triggered signal measurement reporting and a second reporting event associated with an event-triggered signal measurement reporting;
   comparing the period of time with a threshold;
   identifying redundant measurement information associated with the request-triggered signal measurement reporting and the event-triggered signal measurement reporting; and
   controlling a reporting operation according to a result of the comparison and the identification of the redundant measurement information.

2. The method of claim 1, wherein the first reporting event comprises receipt of a request for at least one report.

3. The method of claim 1, wherein the first reporting event comprises a scheduled time to respond to a request for at least one report.

4. The method of claim 1, wherein the first reporting event comprises a time of a periodic report.

5. The method of claim 1, wherein the second reporting event comprises an occurrence of an event that triggers a report.

6. The method of claim 1, wherein the second reporting event comprises a scheduled time to respond to an event that triggers a report.

7. The method of claim 1, wherein the determination of the period of time comprises determining a difference between a first time at which a request for a report was received and a second time at which an event that triggers a report occurred.

8. The method of claim 1, wherein the determination of the period of time comprises determining a difference between a first time at which a report is to be sent in response to a request and a second time at which an event that triggers a report occurred.

9. The method of claim 1, wherein the controlling of the reporting operation comprises determining whether to send a service request for an uplink resource.

10. The method of claim 1, wherein the controlling of the reporting operation comprises controlling which information is sent in a report.

11. The method of claim 1, wherein the controlling of the reporting operation comprises electing to not send a report in response to an event trigger.

12. The method of claim 1, wherein the controlling of the reporting operation comprises controlling which information is sent in a report in response to an event trigger.

13. The method of claim 1, wherein the controlling of the reporting operation is further based on an amount of information to be reported.

14. The method of claim 1, wherein the controlling of the reporting operation is further based on a type of report requested to be sent.

15. The method of claim 1, wherein:
   the controlling of the reporting operation comprises electing to not send a service request for an uplink resource; and
   the method further comprises disabling service requests for an uplink response for a period of time as a result of the election.

16. An apparatus for communication, comprising:
   a memory device; and
   a processing circuit coupled to the memory device and configured to:
      determine a period of time between a first reporting event associated with a request-triggered signal measurement reporting and a second reporting event associated with an event-triggered signal measurement reporting;
      compare the period of time with a threshold;
      identify redundant measurement information associated with the request-triggered signal measurement reporting and the event-triggered signal measurement reporting; and
      control a reporting operation according to a result of the comparison and the identification of the redundant measurement information.

17. The apparatus of claim 16, wherein the determination of the period of time comprises determining a difference between a first time at which a request for a report was received and a second time at which an event that triggers a report occurred.

18. The apparatus of claim 16, wherein the determination of the period of time comprises determining a difference between a first time at which a report is to be sent in response to a request and a second time at which an event that triggers a report occurred.

19. The apparatus of claim 16, wherein the determination of the period of time comprises determining a difference between a first time at which a request for a report was received and a scheduled time to respond to an event that triggers a report.

20. The apparatus of claim 16, wherein the determination of the period of time comprises determining a difference between a first time at which a report is to be sent in response to a request and a scheduled time to respond to an event that triggers a report.

21. The apparatus of claim 16, wherein the controlling of the reporting operation comprises determining whether to send a service request for an uplink resource.

22. The apparatus of claim 16, wherein the controlling of the reporting operation comprises controlling which information is sent in a report.

23. The apparatus of claim 16, wherein the controlling of the reporting operation comprises electing to not send a report in response to an event trigger.

24. The apparatus of claim 16, wherein:
the controlling of the reporting operation comprises electing to not send a service request for an uplink resource; and
the processing circuit is further configured to disable service requests for an uplink response for a period of time as a result of the election.

25. An apparatus for communication, comprising:
means for determining a period of time between a first reporting event associated with a request-triggered signal measurement reporting and a second reporting event associated with an event-triggered signal measurement reporting;
means for comparing the period of time with a threshold;
means for identifying redundant measurement information associated with the request-triggered signal measurement reporting and the event-triggered signal measurement reporting; and
means for controlling a reporting operation according to a result of the comparison and the identification of the redundant measurement information.

26. The apparatus of claim 25, wherein the determination of the period of time comprises determining a difference between a first time at which a request for a report was received and a second time at which an event that triggers a report occurred.

27. The apparatus of claim 25, wherein the determination of the period of time comprises determining a difference between a first time at which a report is to be sent in response to a request and a second time at which an event that triggers a report occurred.

28. The apparatus of claim 25, wherein the controlling of the reporting operation comprises electing to not send a report in response to an event trigger or controlling which information is sent in a report in response to an event trigger.

29. The apparatus of claim 25, wherein:
the controlling of the reporting operation comprises electing to not send a service request for an uplink resource; and
the apparatus further comprises means for disabling service requests for an uplink response for a period of time as a result of the election.

30. A non-transitory computer-readable medium storing computer-executable code, including code to:
determine a period of time between a first reporting event associated with a request-triggered signal measurement reporting and a second reporting event associated with an event-triggered signal measurement reporting;
compare the period of time with a threshold;
identify redundant measurement information associated with the request-triggered signal measurement reporting and the event-triggered signal measurement reporting; and
control a reporting operation according to a result of the comparison and the identification of the redundant measurement information.

* * * * *